US012794618B2

(12) United States Patent
Lanante et al.

(10) Patent No.: US 12,794,618 B2
(45) Date of Patent: Nov. 10, 2026

(54) COMPRESSED LONG RANGE PHYSICAL LAYER PROTOCOL DATA UNIT (PPDU)

(71) Applicant: Ofinno, LLC, Reston, VA (US)

(72) Inventors: Leonardo Alisasis Lanante, Reston, VA (US); Jeongki Kim, Fairfax, VA (US); Esmael Hejazi Dinan, McLean, VA (US); Jiayi Zhang, Rockville, MD (US); Serhat Erkucuk, Reston, VA (US); Tuncer Baykas, Reston, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/452,972

(22) Filed: Jan. 20, 2026

(65) Prior Publication Data

US 2026/0142770 A1 May 21, 2026

Related U.S. Application Data

(63) Continuation of application No. PCT/US2025/033733, filed on Jun. 16, 2025.

(60) Provisional application No. 63/662,434, filed on Jun. 21, 2024.

(51) Int. Cl.
*H04L 5/00* (2006.01)

(52) U.S. Cl.
CPC .................................. *H04L 5/0044* (2013.01)

(58) Field of Classification Search
None
See application file for complete search history.

(56) References Cited

U.S. PATENT DOCUMENTS

2018/0097917 A1* 4/2018 Yu ........................ H04L 27/2657
2018/0324284 A1 11/2018 Sun et al.
2021/0410048 A1* 12/2021 Yu ........................ H04J 11/0086
2023/0247530 A1* 8/2023 Cariou .............. H04W 52/0216 370/311
2023/0370189 A1 11/2023 Liu et al.
2024/0022365 A1 1/2024 Chen et al.
2024/0048418 A1 2/2024 Hu et al.
2024/0048421 A1 2/2024 Hu et al.
2024/0089157 A1 3/2024 Hu et al.
2024/0097820 A1 3/2024 Hu et al.

(Continued)

FOREIGN PATENT DOCUMENTS

CN 117411604 A 1/2024

OTHER PUBLICATIONS

IEEE 802.11-24/0873r0; Apr. 2024; Design Targets and Considerations for Enhanced Long Range; Date: Apr. 8, 2024; Jianhan Liu et al.

(Continued)

*Primary Examiner* — Erika A Washington
(74) *Attorney, Agent, or Firm* — Yasser Mourtada; Kavon Nasabzadeh; James Bender

(57) ABSTRACT

A first station (STA) receives from a second STA a first frame and transmits a physical layer protocol data unit (PPDU) to the second STA. Based on the first frame comprising an indication for the first STA to use a first mode to transmit the PPDU, the first STA transmits the PPDU using the first mode and a first carrier frequency offset of the PPDU is based on a second carrier frequency offset of the first frame. The first mode may comprise an enhanced long range (ELR) operation mode.

20 Claims, 21 Drawing Sheets

(56) References Cited

U.S. PATENT DOCUMENTS

| | | | | |
|---|---|---|---|---|
| 2024/0171441 | A1 | 5/2024 | Hu et al. | |
| 2024/0172278 | A1 | 5/2024 | Chen et al. | |
| 2024/0334347 | A1* | 10/2024 | Yang | H04W 52/325 |
| 2024/0348365 | A1 | 10/2024 | Bansal et al. | |
| 2025/0016036 | A1 | 1/2025 | Lee et al. | |
| 2025/0063612 | A1* | 2/2025 | Cariou | H04W 72/1268 |

OTHER PUBLICATIONS

IEEE 802.11-24/0875r1; May 2024; UHR Enhanced Long Range Support; Date: May 10, 2024; Rui Cao et al.

IEEE 802.11-24/921r0; May 2024; An Enhanced Long Range PPDU; Date: May 9, 2024; Wook Bong Lee et al.

IEEE 802.11-24/1841r0; Nov. 2024; UHR ELR Design Open Topics; Date: Nov. 2024; Rui Cao et al.

Leonardo Lanante Jr. et al.; Improved Abstraction for Clear Channel Assessment in ns-3; 802.11 WLAN Model; Workshop on ns-3—WNS3 2019—ISBN: 978-1-4503-7140-7; Florence, Italy—Jun. 19-20, 2019.

Victor P. Gil Jimenez et al.; Design and Implementation of Synchronization and AGC for OFDM-based WLAN Receivers; Dec. 2004.

Youngwook Son et al.; Symbol Timing Synchronization for Uplink Multi-User Transmission in IEEE; 802.11ax WLAN; IEEE Access; Received Oct. 19, 2018, accepted Nov. 2, 2018, date of publication Nov. 19, 2018, date of current version Dec. 19, 2018.

International Search Report and Written Opinion of the International Searching Authority mailed Oct. 24, 2025 in International Application No. PCT/US2025/033733.

* cited by examiner

600

800

1000

1100

1300

1400

1700

1900

2100

COMPRESSED LONG RANGE PHYSICAL LAYER PROTOCOL DATA UNIT (PPDU)

CROSS-REFERENCE TO RELATED APPLICATIONS

This application is a continuation of International Application No. PCT/US2025/033733, filed Jun. 16, 2025, which claims the benefit of U.S. Provisional Application No. 63/662,434, filed Jun. 21, 2024, all of which are hereby incorporated by reference in their entireties.

BRIEF DESCRIPTION OF THE DRAWINGS

Examples of several of the various embodiments of the present disclosure are described herein with reference to the drawings.

DETAILED DESCRIPTION

Figure 1:
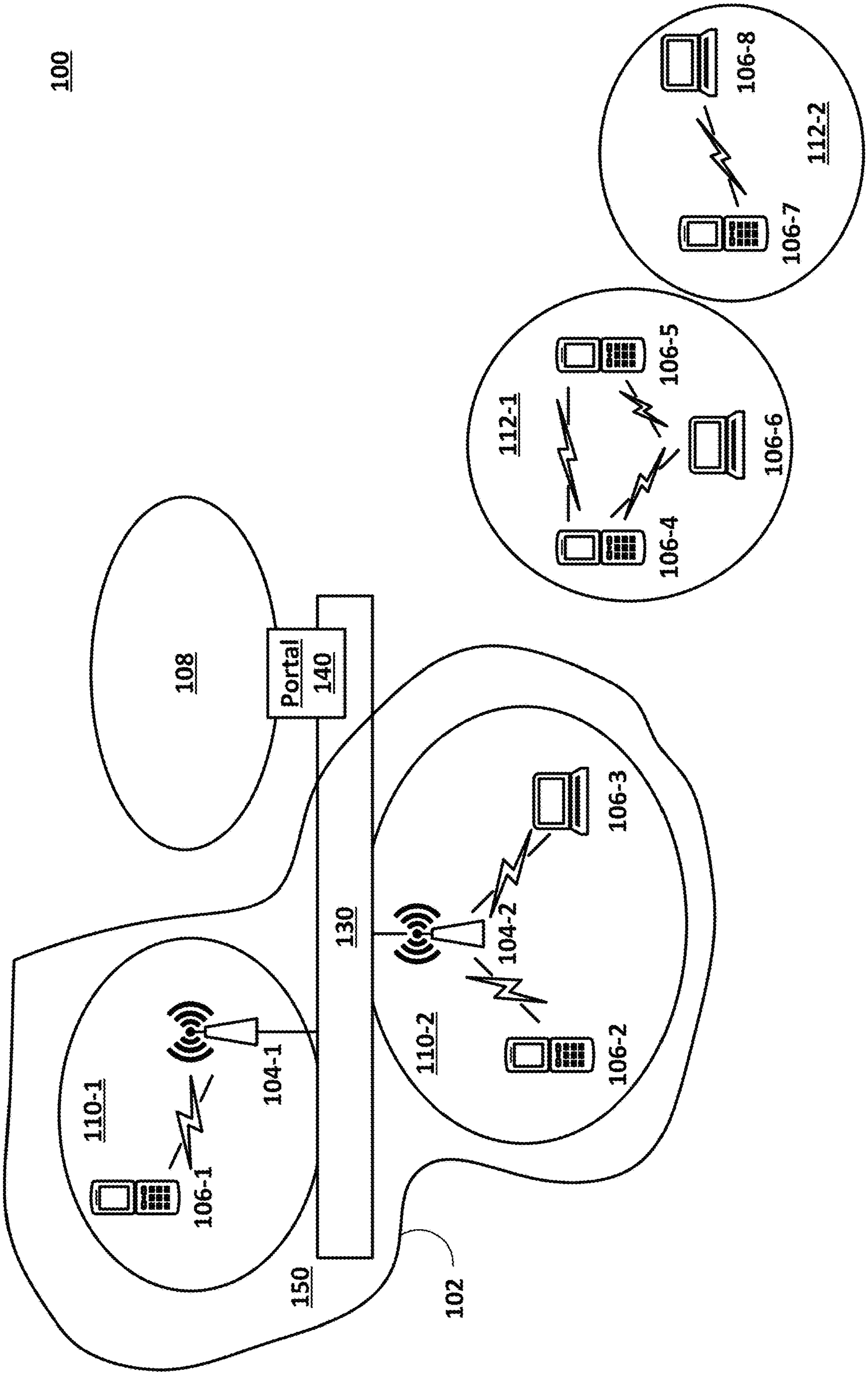
FIG. 1 illustrates example wireless communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. After reading the description, it will be apparent to one skilled in the relevant art how to implement alternative embodiments. The present embodiments may not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a station, an access point, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, may be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={STA1, STA2} are: {STA1}, {STA2}, and {STA1, STA2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages/frames comprise a plurality of parameters, it implies that a parameter in the plurality of parameters is in at least one of the one or more messages/frames but does not have to be in each of the one or more messages/frames.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g., hardware with a biological element) or a combination thereof, which may be behaviorally equivalent. For example, modules may be implemented as a software routine written in a computer language configured to be executed by a hardware machine (such as C, C++, Fortran, Java, Basic, MatLab or the like) or a modeling/simulation program such as Simulink, Stateflow, GNU Octave, or LabVIEW MathScript. It may be possible to implement modules using physical hardware that incorporates discrete or programmable analog, digital and/or quantum hardware. Examples of programmable hardware comprise computers, microcontrollers, microprocessors, application-specific integrated circuits (ASICs); field programmable gate arrays (FPGAs); and complex programmable logic devices (CPLDs). Computers, microcontrollers, and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1 illustrates example wireless communication network 100 in which embodiments of the present disclosure may be implemented. As shown in FIG. 1, the example wireless communication networks may include an Institute of Electrical and Electronic Engineers (IEEE) 802.11 (WLAN) infra-structure network 102. WLAN infra-structure network 102 may include one or more basic service sets (BSSs) 110 and 120 and a distribution system (DS) 130.

BSS 110-1 and 110-2 each includes a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS perform an association procedure to communicate with each other.

DS 130 may be configured to connect BSS 110-1 and BSS 110-2. As such, DS 130 may enable an extended service set (ESS) 150. Within ESS 150, APs 104-1 and 104-2 are connected via DS 130 and may have the same service set identification (SSID).

WLAN infra-structure network 102 may be coupled to one or more external networks. For example, as shown in FIG. 1, WLAN infra-structure network 102 may be connected to another network 108 (e.g., 802.X) via a portal 140. Portal 140 may function as a bridge connecting DS 130 of WLAN infra-structure network 102 with the other network 108.

The example wireless communication networks illustrated in FIG. 1 may further include one or more ad-hoc networks or independent BSSs (IBSSs). An ad-hoc network or IBSS is a network that includes a plurality of STAs that are within communication range of each other. The plurality of STAs are configured so that they may communicate with each other using direct peer-to-peer communication (e.g., not via an AP).

For example, in FIG. 1, STAs 106-4, 106-5, and 106-6 may be configured to form a first IBSS 112-1. Similarly, STAs 106-7 and 106-8 may be configured to form a second IBSS 112-2. Since an IBSS does not include an AP, it does not include a centralized management entity. Rather, STAs within an IBSS are managed in a distributed manner. STAs forming an IBSS may be fixed or mobile.

A STA as a predetermined functional medium may include a medium access control (MAC) layer that complies with an IEEE 802.11 standard. A physical layer interface for a radio medium may be used among the APs and the non-AP stations (STAs). The STA may also be referred to using various other terms, including mobile terminal, wireless device, wireless transmit/receive unit (WTRU), user equipment (UE), mobile station (MS), mobile subscriber unit, or user. For example, the term "user" may be used to denote a STA participating in uplink Multi-user Multiple Input, Multiple Output (MU MIMO) and/or uplink Orthogonal Frequency Division Multiple Access (OFDMA) transmission.

A physical layer (PHY) protocol data unit (PPDU) may be a composite structure that includes a PHY preamble and a payload in the form of a PLCP service data unit (PSDU). For example, the PSDU may include a PHY Convergence Protocol (PLCP) preamble and header and/or one or more MAC protocol data units (MPDUs). The information provided in the PHY preamble may be used by a receiving device to decode the subsequent data in the PSDU. In instances in which PPDUs are transmitted over a bonded channel (channel formed through channel bonding), the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A frequency band may include one or more sub-bands or frequency channels. For example, PPDUs conforming to the IEEE 802.11n, 802.11ac, 802.11ax and/or 802.11be standard amendments may be transmitted over the 2.4 GHz, 5 GHZ, and/or 6 GHz bands, each of which may be divided into multiple 20 MHz channels. The PPDUs may be transmitted over a physical channel having a minimum bandwidth of 20 MHz. Larger channels may be formed through channel bonding. For example, PPDUs may be transmitted over physical channels having bandwidths of 40 MHZ, 80 MHz, 160 MHz, or 520 MHz by bonding together multiple 20 MHz channels.

Figure 2:
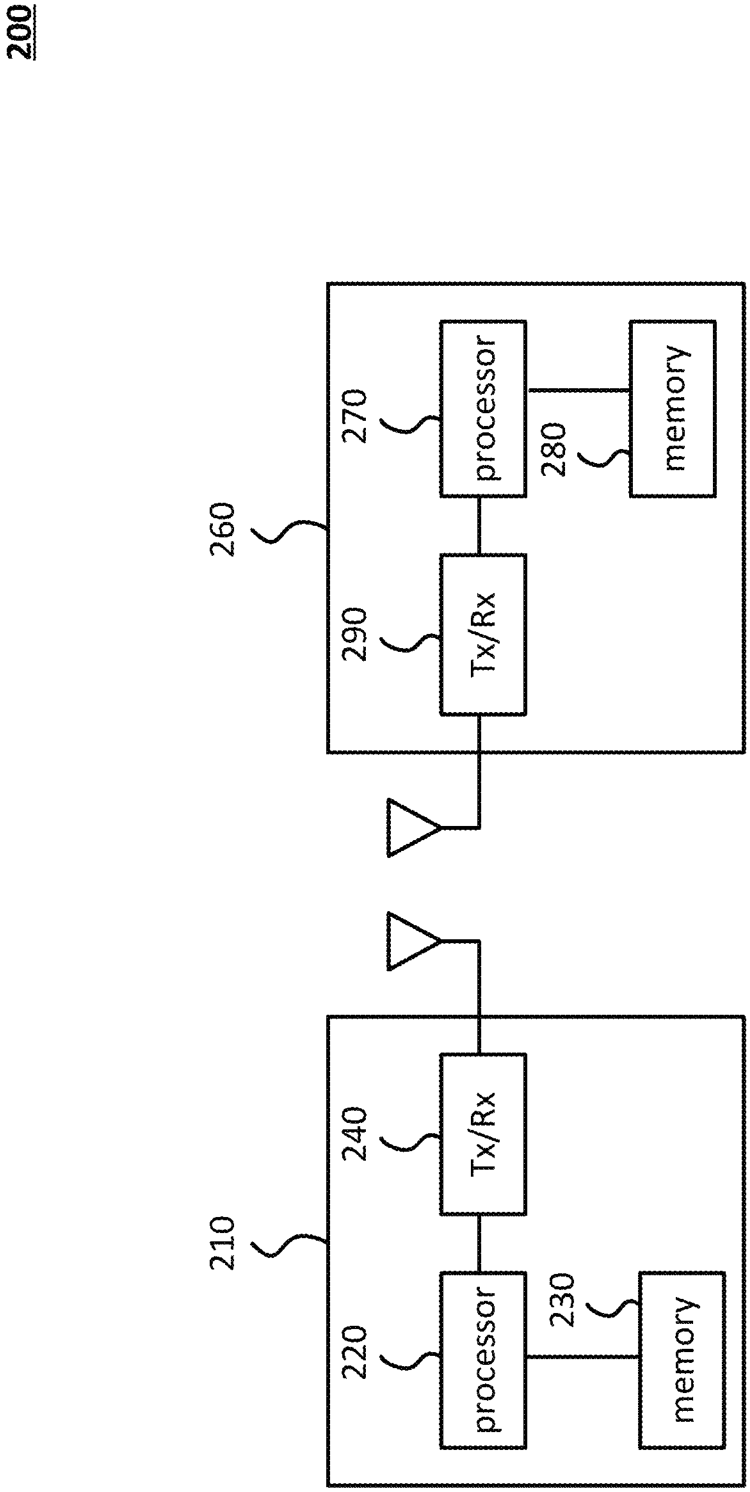
FIG. 2 is a block diagram illustrating example implementations of a station (STA) and an access point (AP).

FIG. 2 is a block diagram 200 illustrating example implementations of a STA 210 and an AP 260. As shown in FIG. 2, STA 210 may include at least one processor 220, a memory 230, and at least one transceiver 240. AP 260 may include at least one processor 270, a memory 280, and at least one transceiver 290. Processor 220/270 may be operatively connected to memory 230/280 and/or to transceiver 240/290.

Processor 220/270 may implement functions of the PHY layer, the MAC layer, and/or the logical link control (LLC) layer of the corresponding device (STA 210 or AP 260). Processor 220/270 may include one or more processors and/or one or more controllers. The one or more processors and/or one or more controllers may comprise, for example, a general-purpose processor, a digital signal processor (DSP), a microcontroller, an application specific integrated circuit (ASIC), a field programmable gate array (FPGA), a logic circuit, or a chipset, for example.

Memory 230/280 may include a read-only memory (ROM), a random-access memory (RAM), a flash memory, a memory card, a storage medium, and/or other storage unit. Memory 230/280 may comprise one or more non-transitory computer readable mediums. Memory 230/280 may store computer program instructions or code that may be executed by processor 220/270 to carry out one or more of the operations/embodiments discussed in the present application. Memory 230/280 may be implemented (or positioned) within processor 220/270 or external to processor 220/270. Memory 230/280 may be operatively connected to processor 220/270 via various means known in the art.

Transceiver 240/290 may be configured to transmit/receive radio signals. In an example, transceiver 240/290 may implement a PHY layer of the corresponding device (STA 210 or AP 260). In an example, STA 210 and/or AP 260 may be a multi-link device (MLD), that is a device capable of operating over multiple links as defined by the IEEE 802.11 standard. As such, STA 210 and/or AP 260 may each implement multiple PHY layers. The multiple PHY layers may be implemented using one or more of transceivers 240/290.

Figure 3:
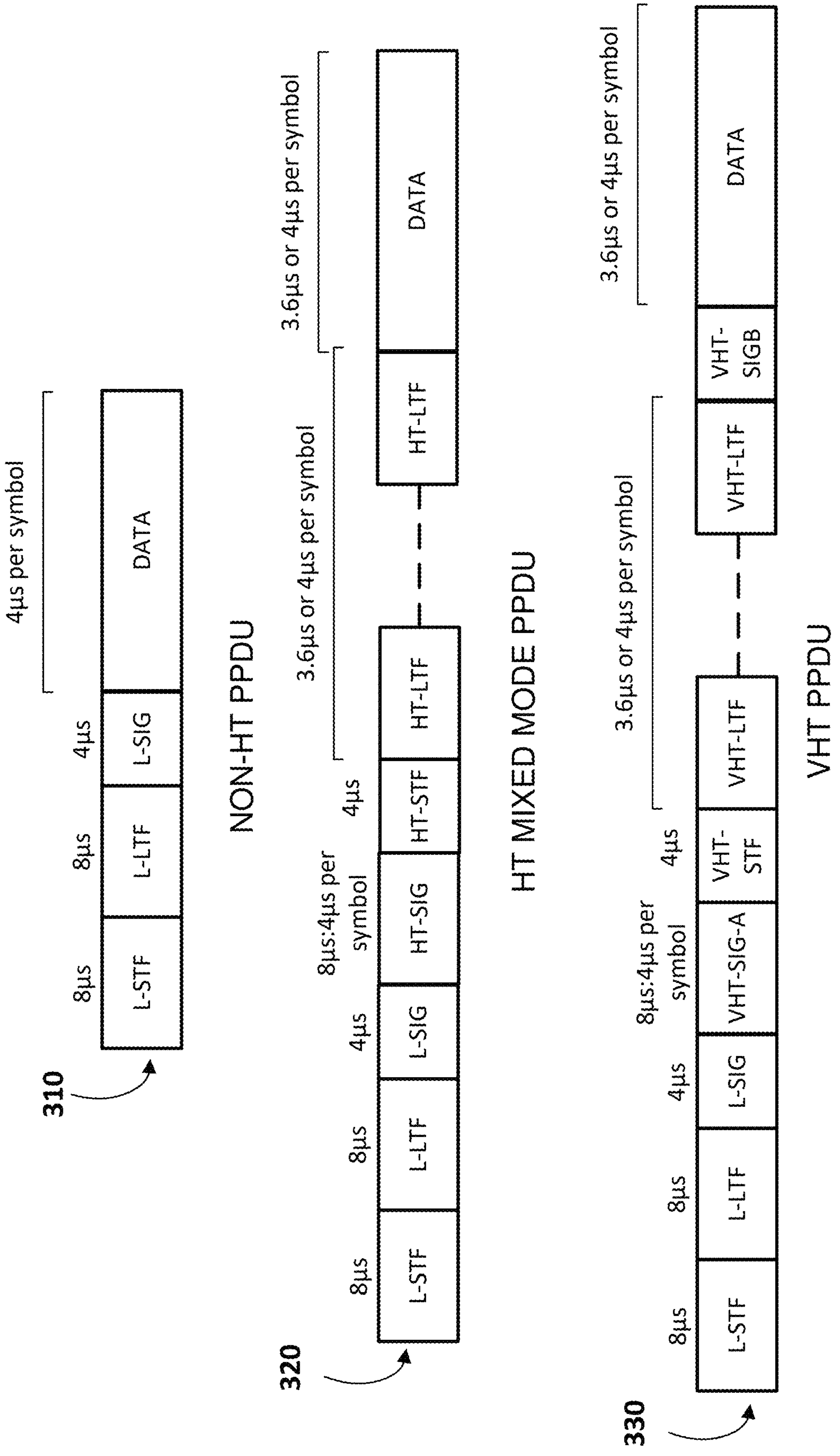
FIG. 3 illustrates a non-High Throughput (non-HT) Physical Layer Protocol Data Unit (PPDU), a High Throughput (HT) mixed PPDU, and a Very High Throughput (VHT) PPDU.

FIG. 3 illustrates a non-High Throughput (non-HT) PPDU 310, a High Throughput (HT) mixed mode PPDU 320, and a Very High Throughput (VHT) PPDU 330.

Non-HT PPDU 310 may be used by STAs conforming to the IEEE 802.11a standard amendment. As shown in FIG. 3, non-HT PPDU 310 includes a non-HT Short Training field (L-STF), a non-HT Long Training field (L-LTF), a non-HT Signal field (L-SIG), and a Data field. The L-STF, L-LTF, and L-SIG form a 20 us preamble of non-HT PPDU 310.

The L-STF may be used by a receiver of non-HT PPDU 310 to synchronize with the carrier frequency and frame timing of a transmitter of non-HT PPDU 310 and to adjust the receiver signal gain. The L-LTF may be used by the receiver of non-HT PPDU 310 to estimate channel coefficients in order to equalize the channel response (e.g., amplitude and phase distortion) in both the L-SIG and the Data fields of non-HT PPDU 310.

The L-SIG contains parameters needed to demodulate the Data field, which contains a payload of non-HT PPDU 310. The L-SIG may be equalized using the channel coefficients estimated using the L-LTF and demodulated to obtain the demodulation parameters of the Data field. The Data Field includes one or more symbols each having a duration of 4 μs, where 3.2 μs carry symbol information and 0.8 μs carry a Guard Interval (GI).

For non-HT PPDUs, the only supported bandwidth is 20 MHz, which is divided into 64 subcarriers. As such, non-HT PPDU 310 may be encoded using a subcarrier spacing of 20 MHz/64 or 312.5 kHz.

HT mixed mode PPDU 320 may be used by STAs conforming to the IEEE 802.11n standard amendment. HT mixed mode PPDU 320 can support MIMO to up to 4 spatial streams, which enhances spectral efficiency four folds. HT mixed mode PPDU 320 has a minimum preamble duration of 35.6 μs, which may increase depending on the number of spatial streams carried by the PPDU.

As shown in FIG. 3, HT mixed mode PPDU 320 includes an L-STF, an L-LTF, an L-SIG, an HT Signal field (HT-SIG) field, an HT Short Training field (HT-STF) field, one or more HT Long Training field (HT-LTF), and a data field. The HT-LTF and data fields include of one or more symbols each having a duration of 3.6 μs or 4 μs. In both cases, 3.2 μs carry symbol information while the remaining 0.4 μs or 0.8 μs carry a GI. The 0.4 μs long GI is called short GI while the 0.8 μs long GI is called regular or normal GI.

For HT mixed mode PPDUs, two bandwidths, 20 MHz and 140 MHz, may be supported. When the PPDU bandwidth is 20 MHz, the band is divided into 64 subcarriers. When the PPDU bandwidth is 140 MHz, the band is divided into 128 subcarriers. In both cases, subcarrier spacing of 312.5 kHz is maintained.

VHT PPDU 330 may be used by STAs conforming to the IEEE 802.11ac standard amendment. VHT PPDU 330 can support MIMO transmission to up to 8 spatial streams, which enhances spectral efficiency eight folds. VHT PPDU 330 has a minimum preamble duration of 39.6 μs, which may increase depending on the number of spatial streams carried by VHT PPDU 330.

As shown in FIG. 3, VHT PPDU 330 includes an L-STF, an L-LTF, an L-SIG, a VHT Signal A field (VHT-SIG-A), a VHT Short Training field (VHT-STF), one or more VHT Long Training field (VHT-LTF), a VHT Signal B field (VHT-SIG-B), and a Data field. The VHT-LTF and Data fields of VHT PPDU 330 include one or more symbols each having a duration of 3.6 μs or 4 μs. In both cases, 3.2 μs carry symbol information while the remaining 0.4 μs or 0.8 μs carry of the GI. The 0.4 μs long GI is called the Short GI while the 0.8 μs long is called regular or normal GI.

For VHT PPDUs, four bandwidths, 20 MHz, 40 MHz, 80 MHz, and 160 MHz, may be supported. When the PPDU bandwidth is 20 MHz, the band is divided into 64 subcarriers. When the PPDU bandwidth is 40 MHz, the band is divided into 128 subcarriers. When the PPDU bandwidth is 80 MHz, the band is divided into 256 subcarriers. When the PPDU bandwidth is 160 MHz, the band is divided into two 256-subcarrier 80 MHz bands. In all cases, a subcarrier spacing of 312.5 kHz is maintained.

Figure 4:
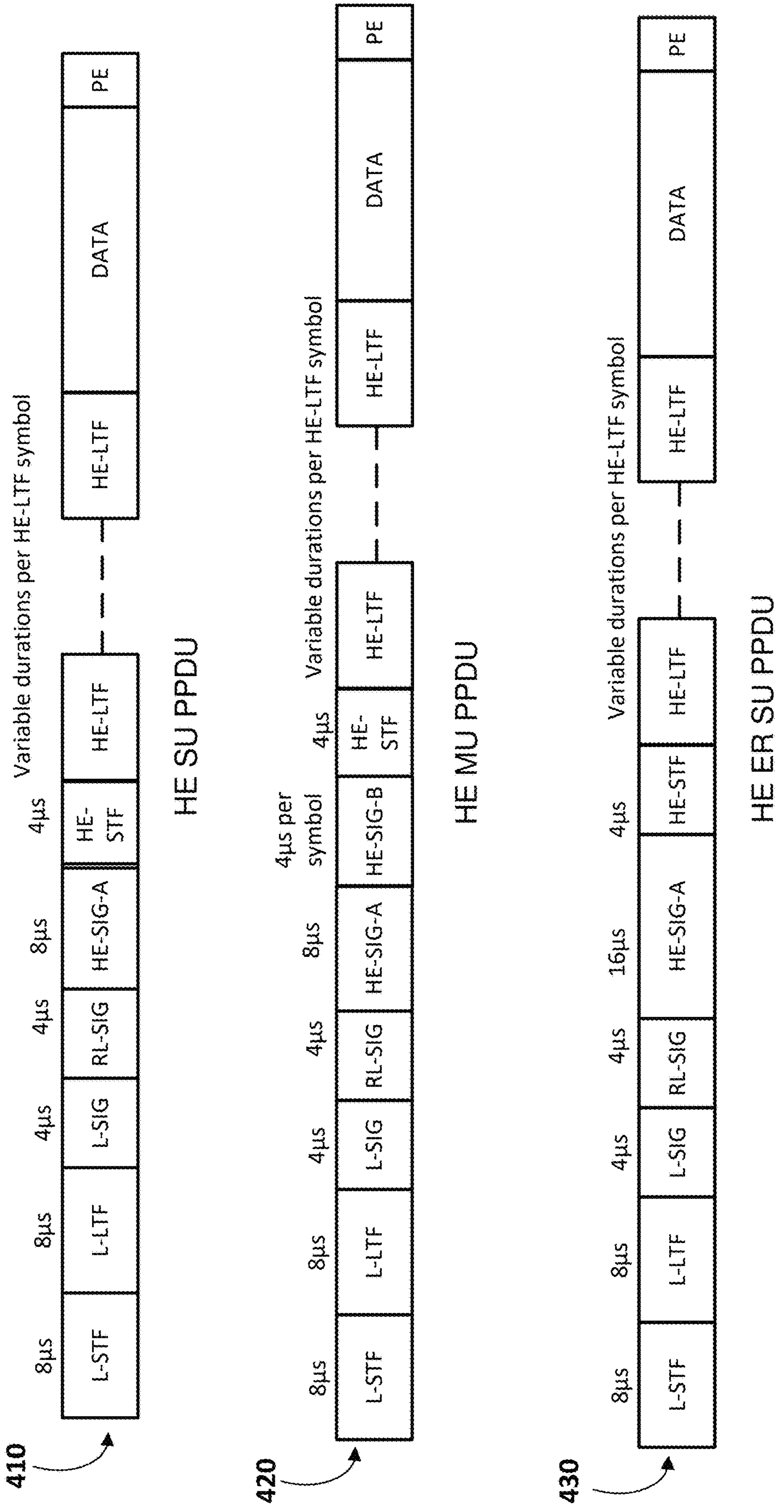
FIG. 4 illustrates a High Efficiency (HE) Single User (SU) PPDU, an HE Multi-User (MU) PPDU, and an HE Extended Range (ER) SU PPDU.

FIG. 4 illustrates a High Efficiency (HE) Single User (SU) PPDU 410, and an HE Multi-User (MU) PPDU 420, and an HE Extended Range (ER) SU PPDU 430. HE SU PPDU 410, HE MU PPDU 420, and HE ER SU PPDU 430 may be used by STAs conforming to the IEEE 802.11ax standard amendment.

HE SU PPDU 410 supports higher spectral efficiency compared to VHT PPDU 330 due to increased subcarrier spacing and higher order modulation support. HE SU PPDU 410 has a minimum preamble duration of 44 μs.

As shown in FIG. 4, HE SU PPDU 410 includes an L-STF, an L-LTF, an L-SIG, a Repeated L-SIG (RL-SIG), an HE Signal A field (HE-SIG-A), an HE Short Training field (HE-STF) field, one or more HE Long Training field (HE-LTF), a Data field, and a PE field.

Similar to HE SU PPDU 410, HE MU PPDU 420 supports higher spectral efficiency compared to VHT PPDU 330. HE MU PPDU 420 also supports OFDMA. Due to denser subcarrier spacing (as in HE SU PPDU 410), HE MU PPDU 420 allows for payloads of multiple users to be multiplexed in the frequency domain in the Data field. HE MU PPDU 420 supports multiplexing the payload of up to 9 μsers in a single 20 MHz band. HE MU PPDU 420 has a minimum preamble duration of 47.2 μs, which may increase depending on the number of spatial streams carried by HE MU PPDU 420.

As shown in FIG. 4, HE MU PPDU 420 includes an L-STF, an L-LTF, an L-SIG, an RL-SIG, an HE-SIG-A, an HE Signal B Field (HE-SIG-B), an HE-STF field, one or more HE-LTF field, a Data field, and a PE field. It is noted that compared to HE SU PPDU 410, HE MU PPDU 420 further includes HE-SIG-B. HE-SIG-B contains indications per STA of RU allocations. A STA may use the indications in HE-SIG-B to locate its payload in HE MU PPDU 420.

For HE SU PPDU 410 and HE MU PPDU 420, the GI portion of the HE-LTF and Data field may be one of one of 0.8 μs, 1.6 μs, and 3.2 μs. An AP or STA may use a suitable GI duration depending on the channel conditions or capability of the target STA or AP.

For both HE SU PPDU 410 and HE MU PPDU 420, the information portion of the HE-LTF may be one of 3.2 μs, 6.4 μs, or 12.8 μs. Depending on the information portion duration, a subcarrier spacing of the HE-LTF may be one of: 312.5 kHz if the information potion is 3.2 μs, 156.25 kHz if the information portion is 6.4 μs, and 78.125 kHz if the information portion is 12.8 μs. Unlike the HE-LTF, the information portion of the Data field for both HE SU PPDU 410 and HE MU PPDU 420 is always 12.8 μs. Hence, a subcarrier spacing of the Data field is always 78.125 kHz corresponding to the duration of the information portion being 12.8 μs. When a 3.2 μs or 6.4 μs long HE-LTF is used by a transmitting STA to transmit HE SU PPDU 410 or HE MU PPDU 420, a receiving STA is required to interpolate the channel estimates to a subcarrier spacing resolution of 78.125 kHz to match the subcarrier spacing of the Data field.

As shown in FIG. 4, HE ER SU PPDU 430 includes an L-STF, an L-LTF, an L-SIG, an RL-SIG, an HE-SIG-A, an HE-STF, one or more HE-LTF, a Data field, and a PE field. It is noted that compared to HE SU PPDU 410, HE ER SU PPDU 430 has an HE-SIG-A that is duplicated in the time domain (16 μs long instead of 8 μs long in HE SU PPDU 410). As such, both L-SIG (duplicated using RL-SIG) and HE-SIG-A are sent in duplicates, which allows a receiving STA to combine the two copies to increase the energy of the received signal. This results in an extended range of reception and increases transmission reliability between the transmitting STA and the receiving STA.

Figure 5:
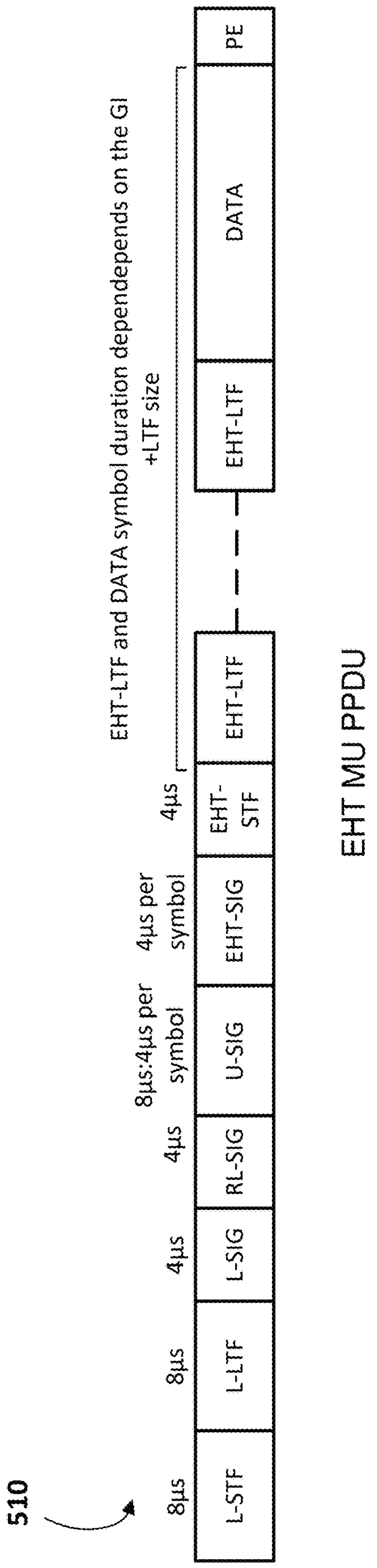
FIG. 5 illustrates an Extremely High Throughput (EHT) Multi-user (MU) PPDU.

FIG. 5 illustrates an Extremely High Throughput (EHT) MU PPDU. EHT MU PPDU 510 supports OFDMA up to a bandwidth of 320 MHz. EHT MU PPDU 510 can improve spectral efficiency due to support of a higher order modulation compared to other PPDUs (e.g., HE SU PPDU 410 and HE MU PPDU 420) while supporting the same number of spatial streams. EHT MU PPDU 510 has a minimum preamble duration of 47.2 μs, which may increase depending on the number of spatial streams carried by EHT MU PPDU 410.

As shown in FIG. 5, EHT MU PPDU 510 includes an L-STF, an L-LTF, an L-SIG, an RL-SIG, a Universal Signal field (U-SIG), an EHT Signal field (EHT-SIG), an EHT Short Training Field (EHT-STF), one or more EHT Long Training fields (EHT-LTF), a Data field, and a PE field. It is noted that according to the IEEE 802.11be standard amendment, EHT MU PPDU 510 may be used by a transmitting STA for both SU and MU transmissions.

The U-SIG is intended to ensure forward compatibility of EHT MU PPDU 510. This means that any future PPDUs that are backward compatible to IEEE 802.11be will contain the same U-SIG field and interpretation. Because of this, IEEE 802.11be STAs will be able to understand at least in part a PPDU developed in a future amendment.

The EHT-SIG contains indications per STA of resource unit (RU) allocations. A STA may use the indications in the EHT-SIG to locate its payload in EHT MU PPDU 510.

The GI portion of the EHT-LTF and Data fields of EHT MU PPDU 510 may be one of: 0.8 μs, 1.6 μs, or 3.2 μs. An AP or STA may use a suitable GI duration depending on the channel conditions or capability of the target STA or AP.

The information portion of the EHT-LTF may be one of 3.2 μs, 6.4 μs, or 12.8 μs. Depending on the information portion duration, a subcarrier spacing of the EHT-LTF may be one of: 312.5 kHz if the information potion is 3.2 μs, 156.25 kHz if the information portion is 6.4 μs, or 78.125 kHz if the information portion is 12.8 μs. The information portion of the Data field of EHT MU PPDU 410 is always 12.8 μs. Hence, a subcarrier spacing of the Data field is always 78.125 kHz corresponding to the duration of the information portion being 12.8 μs. When a 3.2 μs long or a 6.4 μs long EHT-LTF is used by a transmitting STA to transmit EHT MU PPDU 410, a receiving STA is required to interpolate the channel estimates to a subcarrier spacing resolution of 78.125 kHz to match the Data field subcarrier spacing.

Figure 6:
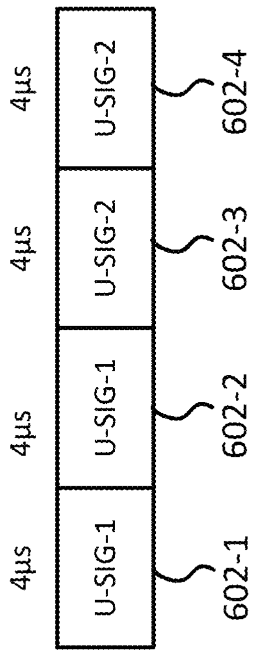
FIG. 6 illustrates an example universal signal (U-SIG) field which may be used in an extended range (ER) PPDU.

FIG. 6 illustrates an example universal signal (U-SIG) field 600 which may be used in an extended range (ER) PPDU. U-SIG field 600 may be used in an ER preamble of the ER PPDU. As shown in FIG. 6, example U-SIG field 600 includes four OFDM symbols 602-1, 602-2, 602-3, and 602-4 (each having a length of 4 microseconds). The coded bits of symbol 602-1 are identical to the coded bits of symbol 602-2, and the coded bits of symbol 602-3 are identical to the coded bits of symbol 602-4. For better frequency diversity, the encoded bits in symbols 602-1 and 602-3 may be interleaved, while the encoded bits in symbols 602-1 and 602-4 may not be interleaved. The constellation mapping of U-SIG field 600 in an ER preamble may be the same as that of the HE-SIG-A field in an HE ER SU PPDU such as HE ER SU PPDU 430.

An EHT STA that receives an ER PPDU with an ER preamble including U-SIG field 600 may decode and interpret the version independent fields in U-SIG field 600 that may be introduced in IEEE 802.11 PHY clauses defined for 2.4, 5, and 6 GHz for EHT PHY onwards. Regardless of the value of a PHY version identifier field in U-SIG field 600, the EHT STA defers for the duration of the ER PPDU, reports the information from the version independent fields within an RXVECTOR, and terminates the reception of the ER PPDU.

Figure 7:
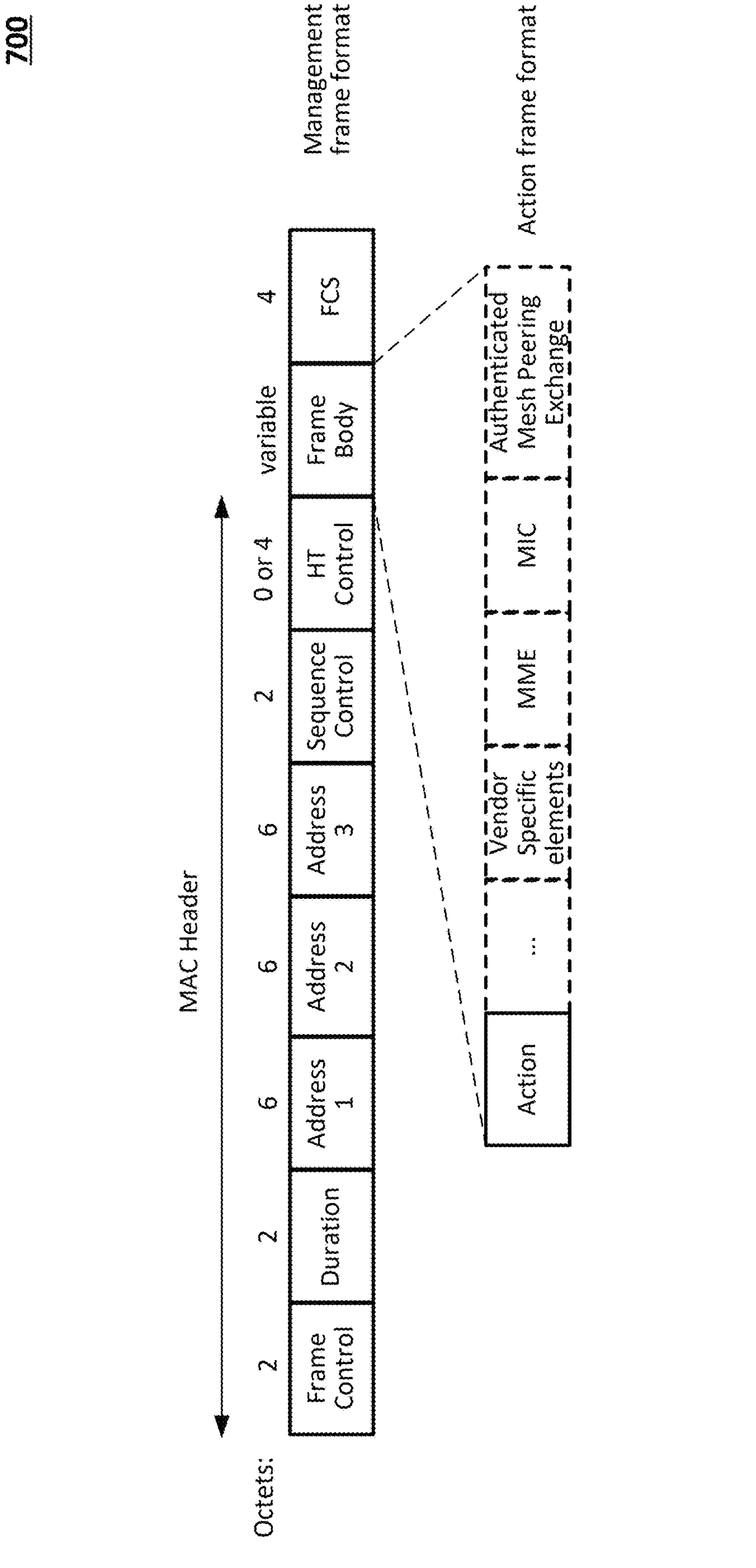
FIG. 7 illustrates an example management frame which may be used as an action frame.

FIG. 7 illustrates an example management frame 700 which may be used as an action frame. In an example, management frame 700 includes a MAC header, a variable length frame body, and a frame check sequence (FCS). The MAC header includes a frame control field, a duration field, an address 1 field, an address 2 field, an address 3 field, a sequence control field, and an optional HT control field. The presence of the HT control field is determined by the setting of a +HTC subfield of the frame control field.

As shown in FIG. 7, when used as an action frame, the frame body of management frame includes an action field, vendor specific elements, management message integrity code element (MME), message integrity code (MIC), and an authenticated mesh peering exchange element.

The action field includes a category field and an action details field. The action field provides a mechanism for specifying extended management actions. The category field indicates a category of the action frame. The action details field contains the details of the action requested by the action frame.

The MME is present when management frame protection is negotiated, the frame is a group addressed robust Action frame, and (MBSS only) the category of the action frame does not support group addressed privacy as indicated by category values; otherwise not present.

The MIC element is present in a self-protected action frame if a shared pairwise master key (PMK) exists between the sender and recipient of this frame; otherwise not present.

The authenticated mesh peering exchange element is present in a self-protected action frame if a shared PMK exists between the sender and recipient of this frame; otherwise not present.

Figure 8:
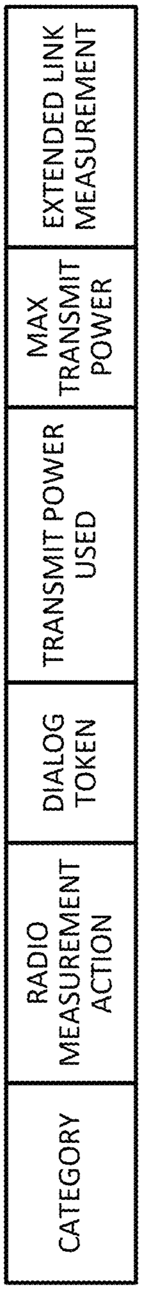
FIG. 8 illustrates a Link Measurement Request frame.

FIG. 8 illustrates a Link Measurement Request frame 800. Link Measurement Request frame 800 may be transmitted by a first STA to request a second STA to respond with a Link Measurement Report frame, which the first STA may use to measure link pathloss and to estimate link margin. In a non-directional multi-gigabit (DMG) BSS, Link Measurement Request frame 800 is an Action frame. In a DMG BSS, Link Measurement Request frame 800 is an Action frame or an Action No Ack frame. As shown in FIG. 8, Link Measurement Request frame 800 includes a Category field, a Radio Measurement Action field, a Dialog Token field, a Transmit Power Used field, a Max Transmit Power field, and an optional Extended Link Measurement field.

The Category field indicates a category of Link Measurement Request frame 800. In an implementation, the Category field is set to a value (e.g., 5) that identifies the category of Link Measurement Request frame 800 as a Radio Measurement Action frame.

The Radio Measurement Action field indicates an action frame format of Link Measurement Request frame 800 from among a plurality action frame formats defined for radio measurement purposes. In an implementation, the Radio Measurement Action field is set to a value (e.g., 2) that identifies the action frame format of Link Measurement Request frame 800 as a Link Measurement Request frame.

The Dialog Token field is set to a nonzero value chosen by the first STA transmitting Link Measurement Request frame 800. The value of the Dialog Token field identifies a dialog comprising Link Measurement Request frame 800 and a corresponding Link Measurement Report frame. The value of the Dialog Token field allows a STA to group management frames sent or received at different times as part of the same dialog.

The Transmit Power Used field is set to a transmit power used to transmit Link Measurement Request frame 800. The Transmit Power Used field indicates the actual power used as measured at the antenna connector, in units of dBm, by the first STA when transmitting Link Measurement Request frame 800. The value of the Transmit Power Used field is determined any time prior to sending Link Measurement Request frame 800 and has a tolerance of ±5 dB.

The Max Transmit Power field provides an upper limit on the transmit power as measured at an antenna connector to be used by the first STA on a current channel. The value of the Max Transmit Power field is set to the minimum of the maximum powers at which the first STA is permitted to transmit on the current channel by device capability, policy, and regulatory authority.

The Extended Link Measurement field is optionally present. When present, the Extended Link Measurement field contains an Extended Link Measurement element. The Extended Link Measurement element includes further information used to solicit a link measurement report.

Figure 9:
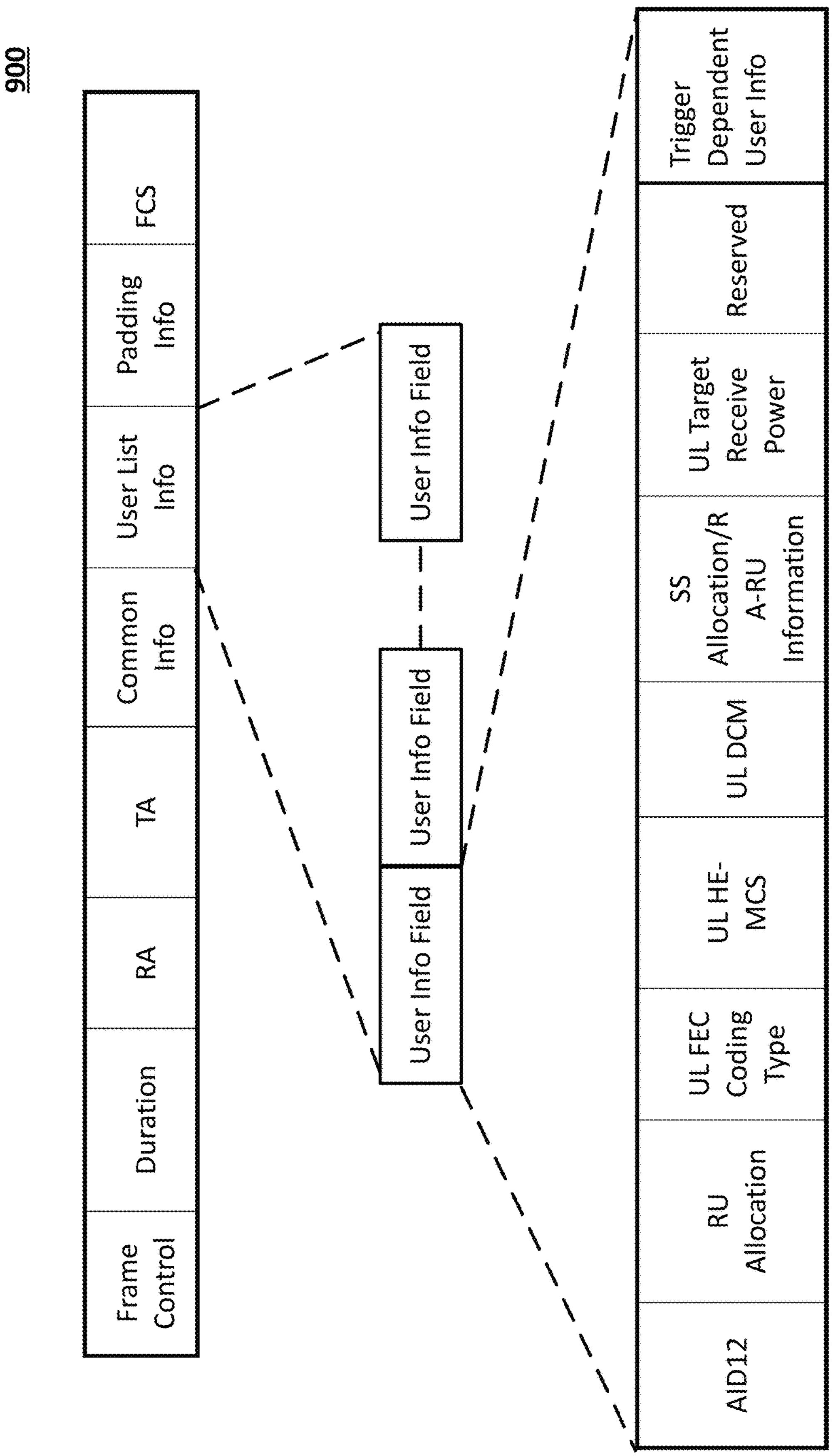
FIG. 9 illustrates an example trigger frame.

FIG. 9 illustrates an example trigger frame 900. Trigger frame 900 may correspond to a basic trigger frame as defined in the existing IEEE 802.11ax standard amendment. Trigger frame 900 may be used by an AP to allocate resources for and solicit one or more trigger-based (TB) PPDU transmissions from one or more STAs. Trigger frame 900 may also carry other information required by a responding STA to transmit a TB PPDU to the AP.

As shown in FIG. 9, trigger frame 900 includes a Frame Control field, a Duration field, a receiver address (RA) field, a transmitter address (TA) field, a Common Info field, a User Info List field, a Padding field, and an FCS field.

The Frame Control field includes the following subfields: protocol version, type, subtype, To DS, From DS, more fragments, retry, power management, more data, protected frame, and +HTC.

The Duration field indicates various contents depending on frame type and subtype and the QoS capabilities of the sending STA. For example, in control frames of the power save poll (PS-Poll) subtype, the Duration field carries an association identifier (AID) of the STA that transmitted the frame in the 16 least significant bits (LSB), and the 2 most significant bits (MSB) are both set to 1. In other frames sent by STAs, the Duration field contains a duration value (in microseconds) which is used by a recipient to update a network allocation vector (NAV).

The RA field is the address of the STA that is intended to receive the incoming transmission from the transmitting station. The TA field is the address of the STA transmitting trigger frame 900 if trigger frame 900 is addressed to STAs that belong to a single BSS. The TA field is the transmitted BSSID if the trigger frame 900 is addressed to STAs from at least two different BSSs of the multiple BSSID set.

The Common Info field may have a format as illustrated by common info field 1000 described further below. The common info field specifies a trigger frame type of trigger frame 900, a transmit power of trigger frame 900 in dBm, and several key parameters of a TB PPDU that is transmitted by a STA in response to trigger frame 900. The trigger frame type of a trigger frame used by an AP to receive QoS data using UL MU operation is referred to as a basic trigger frame.

The User List Info field contains a User Info field per STA addressed in trigger frame 900. The per STA User Info field includes, among others, an AID subfield, an RU Allocation subfield, a Spatial Stream (SS) Allocation subfield, a modulation and coding scheme (MCS) subfield to be used by a STA in a TB PPDU transmitted in response to trigger frame 900, and a Trigger Dependent User Info subfield. The Trigger Dependent User Info subfield can be used by an AP to specify a preferred access category (AC) per STA. The preferred AC sets the minimum priority AC traffic that can be sent by a participating STA. The AP determines the list of participating STAs, along with the BW, MCS, RU allocation, SS allocation, Tx power, preferred AC, and maximum duration of the TB PPDU per participating STA.

The Padding field is optionally present in trigger frame 900 to extend the frame length to give recipient STAs enough time to prepare a response for transmission one SIFS (short interframe spacing) after the frame is received. The Padding field, if present, is at least two octets in length and is set to all 1 s.

The FCS field is used by a STA to validate a received frame and to interpret certain fields from the MAC headers of a frame.

Figure 10:
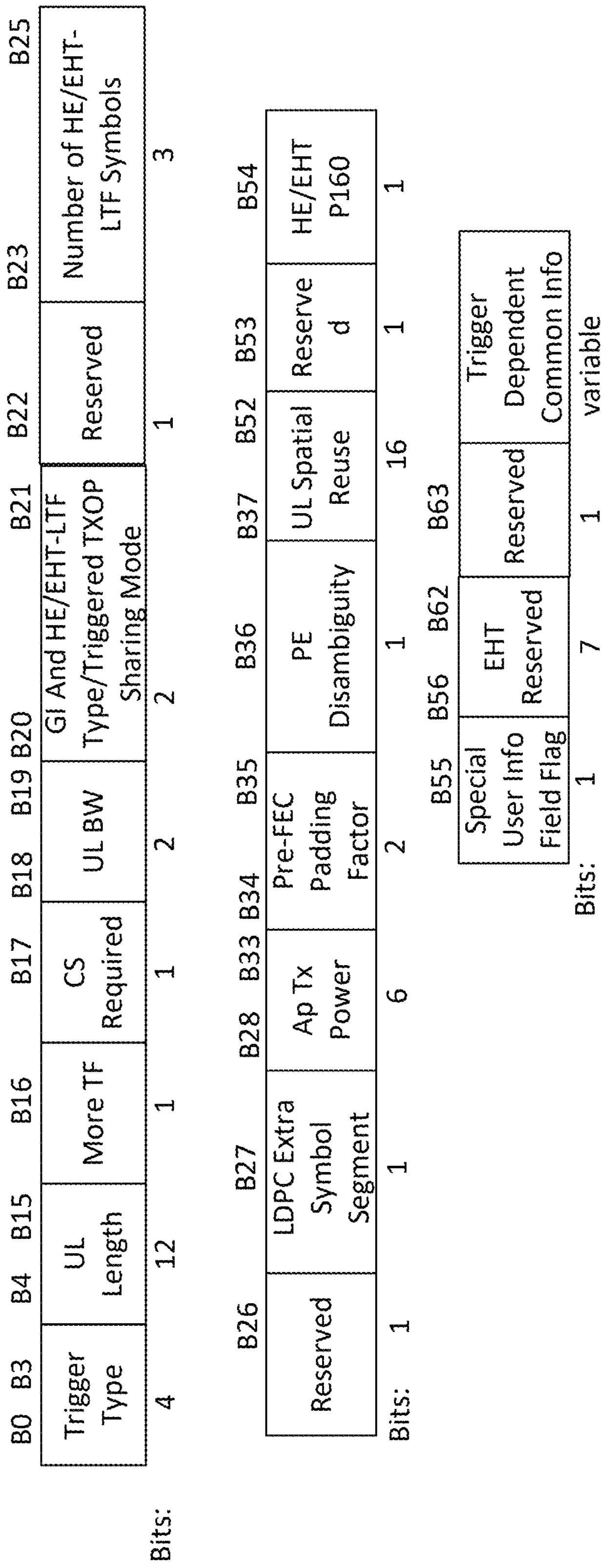
FIG. 10 illustrates an example Common Info field.

FIG. 10 illustrates an example Common Info field 1000. Common Info field 1000 may be similar to the Common Info field of trigger frame 900 or an MU-RTS trigger frame, for example. As shown in FIG. 10, Common Info field 1000 may include a Trigger Type subfield, a UL Length subfield, a More TF subfield, a CS required subfield, a UL BW subfield, a GI and HE/EHT-LTF Type/Triggered TXS Mode subfield, a first Reserved subfield, a Number of HE/EHT-LTF Symbols subfield, a second Reserved subfield, an LDPC Extra Symbol Segment subfield, an AP Tx Power subfield, a Pre-FEC Padding Factor subfield, a PE Disambiguity subfield, an UL Spatial Reuse subfield, a third Reserved subfield, an HE/EHT P160 subfield, a Special User Info Field Flag subfield, an EHT Reserved subfield, a fourth Reserved subfield, and a Trigger Dependent Common Info subfield. The Trigger Type subfield, UL Length subfield, More TF subfield, CS required subfield, UL BW subfield, GI and HE-LTF Type/Triggered TXS Mode subfield, first Reserved subfield, Number of HE/EHT-LTF Symbols subfield, second Reserved subfield, LDPC Extra Symbol Segment subfield, AP Tx Power subfield, Pre-FEC Padding Factor subfield, PE Disambiguity subfield, UL Spatial Reuse subfield, third Reserved subfield, HE/EHT P160 subfield, Special User Info Field Flag subfield, EHT Reserved subfield, fourth Reserved subfield, and Trigger Dependent Common Info subfield may have the same content and interpretation as corresponding subfields of an EHT variant Common Info field defined in the IEEE 802.11be draft amendment ("IEEE P802.11be/D3.1, March 2023").

Figure 11:
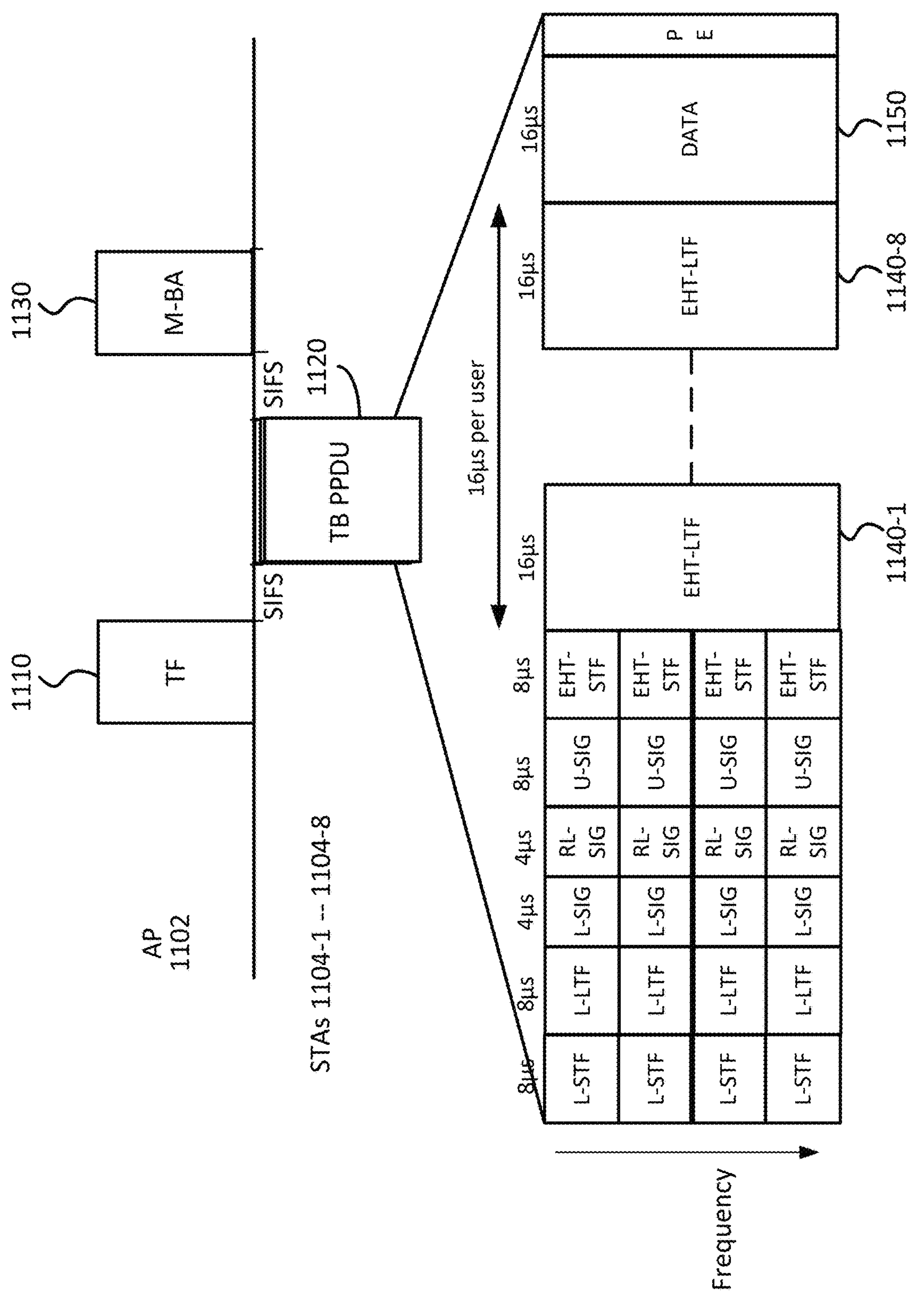
FIG. 11 illustrates an example of using a trigger-based (TB) PPDU.

FIG. 11 illustrates an example 1100 using a TB PPDU. As shown in FIG. 11, example 1100 includes an AP 1102 and a plurality of STAs 1104-1 to 1104-8.

In an example, AP 1102 may transmit TF 1110 to STAs 1104-1 to 1104-8 to solicit UL frames from STAs 1104-1 to 1104-8. STAs 1104-1 to 1104-8 may respond simultaneously to TF 1110 by each transmitting a TB PPDU 1120. In an example, TB PPDU 1120 may have an 80 MHz bandwidth. As shown in FIG. 11, a STA 1104 may duplicate four times over frequency each of the fields L-STF, L-LTF, L-SIG, RL-SIG, U-SIG, and EHT-STF to fill out the 80 MHz bandwidth. EHT-LTFs 1140 and a data field 1150 of PPDU 1120 may fill out the entire 80 MHz bandwidth and are not duplicated over frequency. The number of EHT-LTFs transmitted by the STA (in time) is based on the maximum number of spatial streams across all RUs contained in the TB PPDU 1120. In example 1100, TB PPDU 1120 includes eight EHT-LTFs 1140-1 to 1140-8. AP 1102 may acknowledge TB PPDU 1120 by transmitting a multi-user block acknowledgment frame M-BA 1130.

As TB PPDUs 1120 transmitted by STAs 1104-1 to 1104-8 are transmitted simultaneously in response to TF 1110, precorrection of time, frequency, sampling clock, and power (in the case of a High Efficiency (HE) TB PPDU or extremely high throughput (EHT) TB PPDU) by STAs 1104-1 to 1104-8 may be necessary to mitigate synchronization and interference issues at AP 1102. Specifically, frequency and sampling clock precorrections are needed to prevent inter-carrier interference. Power precorrection is necessary to control interference between TB PPDUs 1120.

In an implementation, TF 1110 includes in a User Info field an uplink (UL) Target Receive Power subfield that indicates whether a STA among STAs 1104-1 to 1104-8 is to transmit TB PPDU 1120 at a maximum transmit power. The maximum transmit power may correspond to the STA's maximum transmit power for the assigned HE-MCS. The STA transmits TB PPDU 1120 at the maximum transmit power when the UL Target Receive Power subfield indicates that the maximum transmit power is to be used. Otherwise, the STA calculates the transmit power, $$Tx_{pwr}^{STA},$$

of TB PPDU 1120 for the assigned HE-MCS using the equation:

$$Tx_{pwr}^{STA} = PL_{DL} + TargetRx_{pwr}$$

where $PL_{DL}$ is the downlink pathloss and $TargetRx_{pwr}$ is the expected receive signal power, in units of dBm, as indicated by the UL Target Receive Power subfield in the User Info field of TF 1110. If the STA applies beamforming to TB PPDU 1120, the STA may take into account the beamforming gain when calculating the transmit power.

In an implementation, the STA computes $PL_{DL}$ using the equation:

$$PL_{DL} = Tx_{pwr}^{AP} - Rx_{pwr}$$

where $$Tx_{pwr}^{AP}$$

is the AP's transmit power, in units of dBm/20 MHz, as indicated by an AP Tx Power subfield of a Common Info field of TF 1110 and $Rx_{pwr}$ is the receive signal power, in units of dBm/20 MHz, of TF 1110 at an antenna connector of the STA. $Rx_{pwr}$ may be an average of the receive signal power over the antennas on which the average $PL_{DL}$ is being computed.

Due to the finite accuracy of clock generating circuits of an AP and a STA, an AP and an associated STA tuned to the same carrier frequency may have errors in their generated carrier frequencies in reference to the ideal carrier frequency. When an AP receives a TB PPDU as in example 1100, the AP may observe a baseband signal whose center frequency has an offset (i.e. carrier frequency offset or CFO) from the DC subcarrier. Similarly, an AP receiving the symbols of a TB PPDU sampled using its own clock may observe that the TB PPDU signal is generated at a clock offset (i.e. symbol clock offset or SCO) from its own sampling clock. Both SCO and CFO may result in receive errors when not properly mitigated. In order to limit the effects of CFO and SCO, a STA compensates for carrier frequency offset (CFO) error and symbol clock error with respect to TF 1110 when TB PPDU 1120 is a TB PPDU or a non-HT or non-HT duplicate PPDU with the TXVECTOR parameter TRIGGER RESPONDING set to true. After compensation, the absolute value of residual CFO error with respect to TF 1110 shall not exceed the following levels when measured at the 10% point of a complementary cumulative distribution function (CCDF) of CFO errors in Additive White Gaussian Noise (AWGN) at a received power of −60 dBm in the primary 20 MHz channel: 350 Hz for the data subcarriers of a TB PPDU; 2 kHz for a non-HT PPDU or non-HT duplicate PPDU. The residual CFO error measurement on an HE TB PPDU shall be made after the HE-SIG-A field. The residual CFO error measurement on an EHT TB PPDU shall be made after the U-SIG field. The residual CFO error measurement on a non-HT or non-HT duplicate PPDU shall be made after the L-STF field. The symbol clock error shall be compensated by the same ppm amount as the CFO error.

Figure 12:
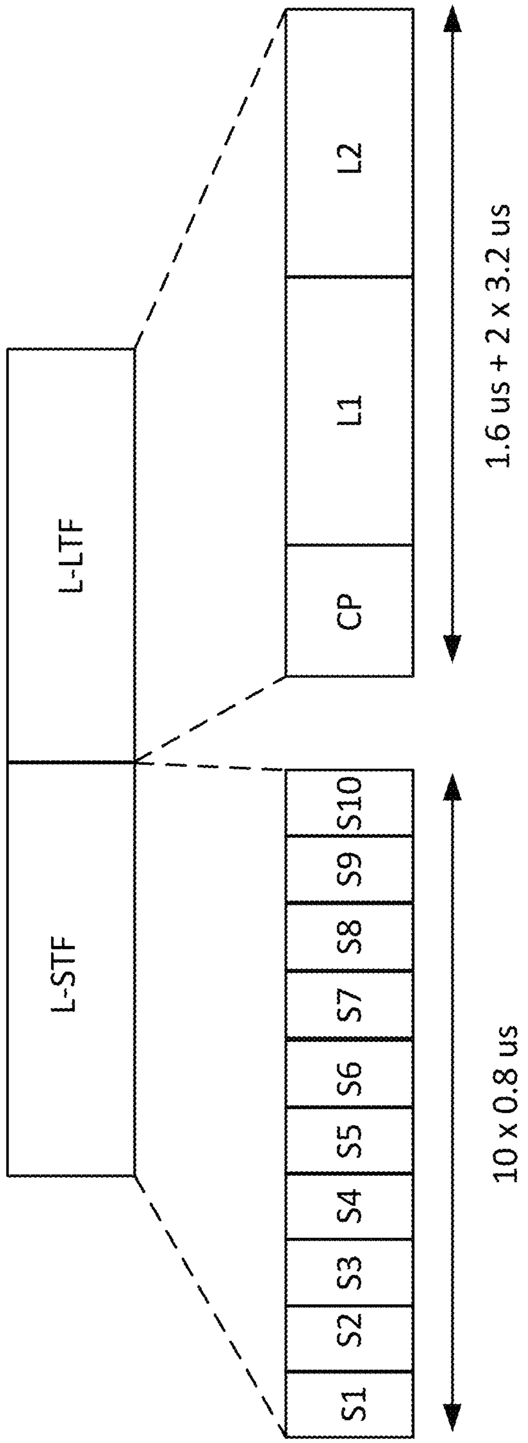
FIG. 12 illustrates a non-HT Short Training field (L-STF) and a non-HT Long Training field (L-LTF).

FIG. 12 illustrates the L-STF and the L-LTF. The L-STF and the L-LTF are part of a non-HT (or legacy) preamble of a non-HT PPDU as illustrated by non-HT PPDU 310. Additionally, as shown in FIGS. 3-5, the legacy preamble is prepended to an HT mixed mode PPDU, a VHT PPDU, HE PPDUs, and EHT PPDUs. As shown in FIG. 12, the L-STF and the L-LTF each has a duration of 8 microseconds. The L-STF includes ten OFDM symbols called Short Training Symbols (STS). The L-STF is formed by the repetition of ten short symbols, S1 to S10, of 16 samples each. The L-STF may be used by a receiver for packet detection, automatic gain control (AGC), and coarse acquisition and frequency synchronization. The L-LTF includes a cyclic prefix (CP) of 1.6 microseconds and two identical symbols Long Training Symbols (LTS) L1 and L2 of 3.2 microseconds each. The CP of the L-LTF is twice as long as the CP of other symbols. The L-LTF may be used by a receiver for channel estimation and fine frequency offset correction.

Figure 13:
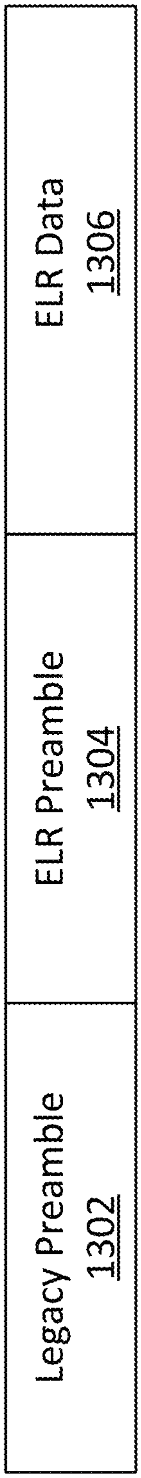
FIG. 13 illustrates an example extended long range (ELR) PPDU.

FIG. 13 illustrates an example extended/enhanced long range (ELR) PPDU 1300. ELR PPDU 1300 is proposed to allow a STA to increase its transmission range. For example, a common problem in existing Wi-Fi environments is the asymmetry between the downlink transmission range of an AP and the uplink transmission range of a STA associated with the AP. When the STA is an edge STA (i.e., located at the edge of the AP's transmission range), the asymmetry results in the STA successfully receiving PPDUs from the AP but being unable to communicate with the AP. ELR PPDU 1300 may reduce this downlink/uplink transmission range asymmetry by enabling the STA to increase its uplink transmission range to successfully reach the AP.

Figure 14:
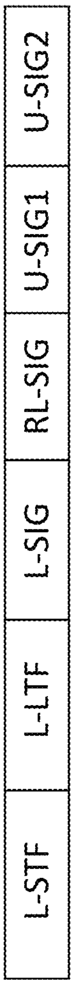
FIG. 14 illustrates a legacy preamble that may be used in an ELR PPDU.

As shown in FIG. 13, ELR PPDU 1300 includes a legacy preamble 1302, an ELR preamble 1304, and an ELR data portion 1306. Legacy preamble 1302 enables backward compatibility of ELR PPDU 1300. Specifically, legacy preamble 1302 allows legacy IEEE 802.11 to detect ELR PPDU 1300. Legacy preamble 1302 may take various formats. For example, according to a first option, legacy preamble 1302 may include an L-STF, an L-LTF, and an L-SIG. According to a second option, legacy preamble 1302 may further include an RL-SIG after the L-SIG. The presence of the RL-SIG in legacy preamble 1302 increases the range of ELR PPDU 1300 when received by a legacy IEEE 802.11 STA. In a third option, legacy preamble 1302 further includes one or more U-SIG fields, after the L-SIG and the RL-SIG. For example, legacy preamble 1302 may be as illustrated by legacy preamble 1400 in FIG. 14. The one or more U-SIG fields provide U-SIG information that is used by a STA receiving ELR PPDU 1300. For example, the one or more U-SIG fields may indicate a TXOP duration associated with ELR PPDU 1300, a BSS Color associated with the STA transmitting ELR PPDU 1300, a bandwidth associated with ELR PPDU 1300, an UL/DL indication, and a PHY version of ELR PPDU 1300.

ELR preamble 1304 may include an ELR-STF, an ELR-LTF, and an ELR-SIG. Similar to the L-STF, the ELR-STF may be used by a receiver (e.g. an AP) of an ELR PPDU 1300 to synchronize with the carrier frequency and frame timing of the transmitter of the ELR PPDU 1300 (e.g. an edge STA) and to adjust the receiver signal gain. The L-LTF may be used by the receiver (e.g. an AP) of an ELR PPDU 1300 to estimate channel coefficients in order to equalize the channel response (e.g., amplitude and phase distortion) in both the ELR-SIG and ELR data portion 1306 of ELR PPDU 1300.

The ELR-STF may be a longer version of L-STF to support longer range synchronization compared to L-STF. Similarly, ELR-LTF may be a longer version of L-LTF to support higher robustness when estimating the channel coefficients from the edge STA to the AP. The ELR-LTF may also include a higher number of symbol repetitions compared to the L-STF (e.g., 2). It is noted that due to legacy preamble 1302, ELR preamble 1304 may be designed with a higher degree of flexibility without sacrificing backward compatibility.

Due to the value of the U-SIG information to a legacy STA that receives ELR PPDU 1300, it is desirable that ELR PPDU 1300 include the one or more U-SIG fields in legacy preamble 1302. For example, including the U-SIG fields can enable an edge STA to communicate the BSS Color and TXOP duration associated with ELR PPDU 1300 for added protection from OBSS transmissions. Including the U-SIG increases the overhead due to the legacy preamble 1302. Additionally, to increase the transmission range, longer ELR-STF and ELR-LTF may be needed in ELR preamble 1304. These, however, increase the size of ELR PPDU 1300 and the overhead associated with its transmission.

Embodiments of the present disclosure, as further described below, address this problem of existing technologies. In an aspect, an ELR PPDU is proposed. The proposed ELR PPDU reuses portions of the legacy preamble as portions of the ELR preamble, thereby significantly reducing the size of the ELR PPDU. In an embodiment, the L-LTF of the legacy preamble is reused as an ELR-STF of the ELR preamble. In an embodiment, to enable this reuse, a receiver of the ELR PPDU may transmit to a transmitter of the ELR PPDU a first frame that allows the transmitter to pre-compensate a carrier frequency offset of the ELR PPDU. In another embodiment, the first frame allows the transmitter to determine and apply a power offset to the ELR PPDU. The transmitter may transmit the ELR PPDU with a pre-compensated carrier frequency offset and/or with a pre-compensated transmit power. This eliminates the need of the receiver of the ELR PPDU to perform carrier frequency offset (CFO) estimation and/or automatic gain control (AGC) based on the ELR-STF. The receiver of the ELR PPDU may perform packet detection and/or coarse symbol timing based on the ELR-STF. In another aspect, the transmitter of the ELR PPDU may determine, based on the first frame, a received signal strength indicator (RSSI) of the first frame and a first carrier frequency offset of the first frame. The transmitter of the ELR PPDU may transmit the ELR PPDU with a second carrier frequency offset based on the first carrier frequency offset. In an embodiment, the second carrier frequency offset of the ELR PPDU is based on the first carrier frequency offset of the first frame based on the RSSI of the first frame being less than a threshold.

Figure 15:
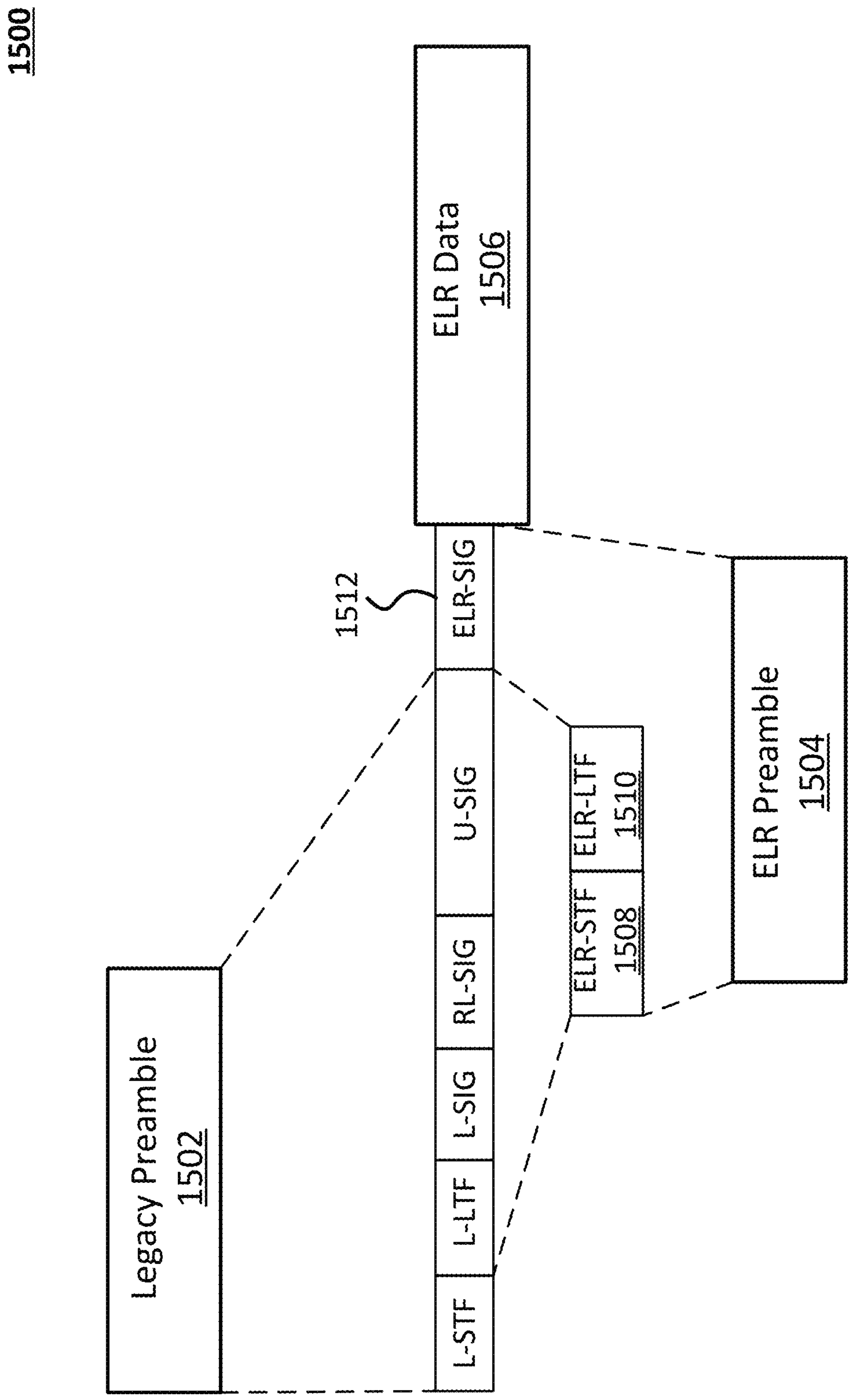
FIG. 15 illustrates an example ELR PPDU according to an embodiment.

FIG. 15 illustrates an example ELR PPDU 1500 according to an embodiment. As shown in FIG. 15, example ELR PPDU 1500 includes a legacy preamble 1502, an ELR preamble 1504, and an ELR data portion 1506. Legacy preamble 1502 includes an L-STF, an L-LTF, an L-SIG, an RL-SIG, and a U-SIG. The L-STF, L-LTF, and L-SIG are described in FIG. 3 above. The RL-SIG is described in FIG. 4 above. The U-SIG may comprise one or more U-SIG symbols. For example, the U-SIG may comprise two U-SIG symbols or four U-SIG symbols as described in FIG. 6 above.

ELR preamble 1504 includes an ELR-STF 1508, an ELR-LTF 1510, and an ELR-SIG 1512. As shown in FIG. 15, ELR-STF 1508 and ELR-LTF 1510 may reuse the L-LTF, L-SIG, RL-SIG, and U-SIG of legacy preamble 1502. In an embodiment, the L-LTF of legacy preamble 1502 provides ELR-STF 1508. That is, a receiver of ELR PPDU 1500 interprets the L-LTF of legacy preamble 1502 as both an L-LTF and as an ELR-STF. For example, the receiver of ELR PPDU 1500 may use the L-LTF to estimate channel coefficients to equalize a channel response (e.g., amplitude and phase distortion) in both the L-SIG and data portion 1506 of ELR PPDU 1500. Additionally, the receiver of ELR PPDU 1500 may use the L-LTF (as an ELR-STF) for packet detection, AGC, coarse symbol timing, and coarse CFO estimation. For example, if the receiver of ELR PPDU 1500 fails to detect ELR PPDU 1500 by searching one of the 10 STS of the L-STF due to a low signal-to-noise ratio (SNR), the receiver may successfully detect one of the two Long Training Symbols (LTS) in the L-STF of ELR PPDU 1500.

In an embodiment, one or more of the L-LTF, L-SIG, RL-SIG, and U-SIG of legacy preamble 1502 may provide ELR-LTF 1510. ELR-SIG 1512 may include indications per STA of resource unit (RU) allocations. A STA may use the indications in the ELR-SIG 1512 to locate its payload in ELR PPDU 1500.

Figure 16:
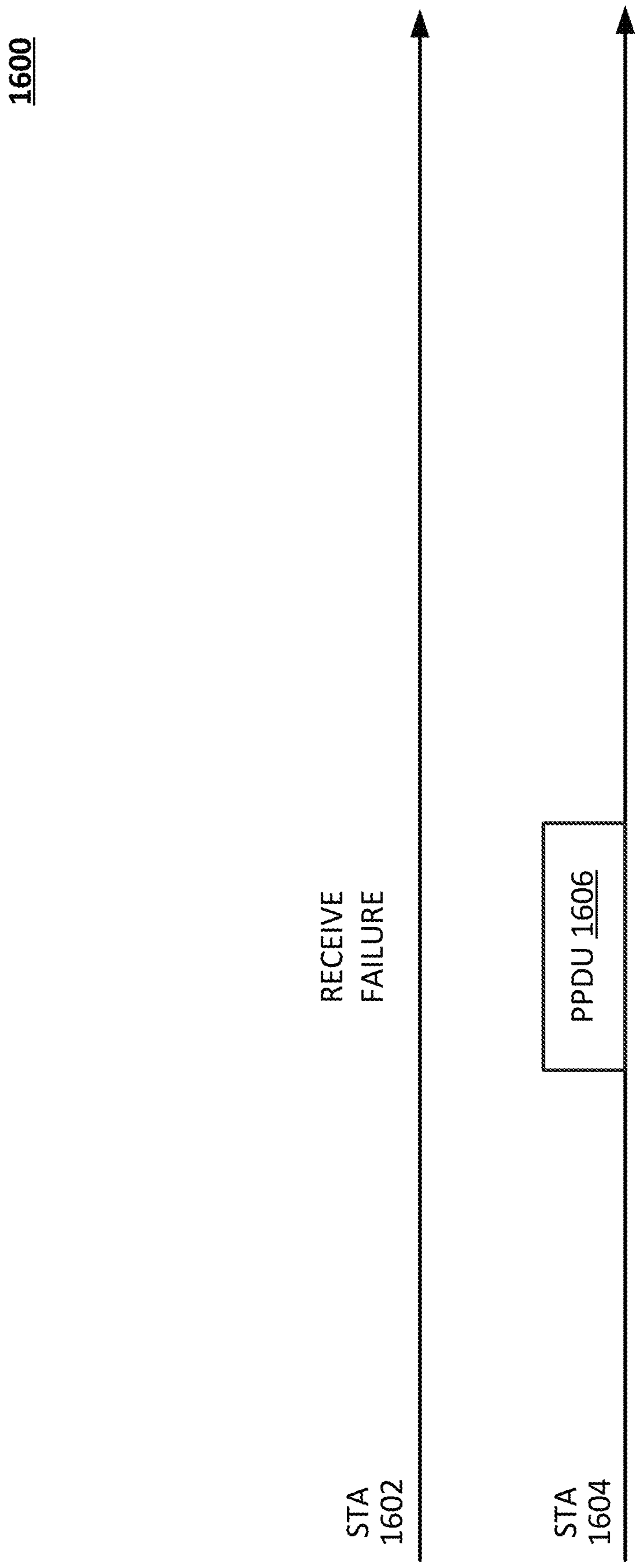
FIG. 16 illustrates an example that highlights a potential problem that may arise using the example ELR PPDU of FIG. 15.

FIG. 16 illustrates an example 1600 that highlights a potential problem that may arise using example ELR PPDU 1500 described above. As shown in FIG. 16, example 1600 includes a STA 1602 and a STA 1604. In an example, STA 1602 may be an AP STA, and STA 1604 may be a non-AP STA, or vice versa. In another example, STAs 1602 and 1604 may be AP STAs or non-AP STAs.

In example 1600, STA 1604 transmits a PPDU 1606 to STA 1602. PPDU 1606 may be an ELR PPDU such as ELR PPDU 1500. PPDU 1606 may carry a frame, such as a control frame, a management frame, or a data frame, for example. In an example, STA 1604 may transmit PPDU 1606 using enhanced distributed channel access (EDCA). In this example, STA 1604 may transmit PPDU 1606 as an SU PPDU (e.g. HE SU PPDU, HE ER SU PPDU) or an MU PPDU (e.g. EHT MU PPDU or HE MU PPDU). In an example, in transmitting PPDU 1606, STA 1604 may use a maximum transmit power of STA 1604 for an MCS used by STA 1604 to transmit PPDU 1606. In another example, when STA 1604 transmits PPDU 1606 in response to a triggering frame, STA 1604 may determine a transmit power for PPDU 1606, as described above with respect to FIG. 11, based on a downlink pathloss and an expected receive signal power of PPDU 1606 at STA 1602.

In example 1600, STA 1602 may receive PPDU 1606 with a receive signal power that does not allow STA 1602 to detect/decode the L-STF of the legacy preamble of PPDU 1606. As described above, the L-STF is used by a receiver to perform packet detection, AGC, coarse symbol timing, and coarse CFO estimation. In an implementation, STA 1602 may be configured, when failing to detect/decode the L-STF, to use the ELR-STF of the ELR preamble of PPDU 1606 to perform the receiver functions that are performed based on the L-STF. In another implementation, STA 1602 may be configured, when failing to detect/decode the L-STF, to use the L-LTF of the legacy preamble of PPDU 1606 to perform the receiver functions that are performed based on the L-STF. STA 1602 may be configured to do so in order to reduce the latency of decoding PPDU 1606 by not waiting for the ELR-STF (which is only available after the L-LTF, L-SIG, RL-SIG, and U-SIG symbols have been received). As the L-LTF serves an ELR-STF (or L-STF) in PPDU 1606, STA 1602 may thus need to perform packet detection, AGC, coarse symbol timing, and coarse CFO estimation based on the L-LTF of the legacy preamble of PPDU 1606. However, as the L-LTF has a maximum of two symbol repetitions, the L-LTF may not be used for AGC. Further, with a subcarrier spacing of only 312.5 KHz, a coarse CFO estimation performed based on the L-LTF may be up to four times worse than a coarse CFO estimation performed based on the L-STF. STA 1602 may thus fail to receive PPDU 1606.

In embodiments further described below, the STA transmitting an ELR PPDU such as ELR PPDU 1500 may pre-compensate a transmit power and/or a carrier frequency offset of the ELR PPDU. This eliminates the need of the receiver of the ELR PPDU to perform CFO estimation and/or AGC based on the ELR-STF (provided by the L-LTF). The receiver of the ELR PPDU may perform packet detection and/or coarse symbol timing based on the ELR-STF. With the ELR PPDU pre-compensated for carrier frequency offset and transmit power, the receiver may successfully receive the ELR PPDU based on detecting the ELR-STF.

Figure 17:
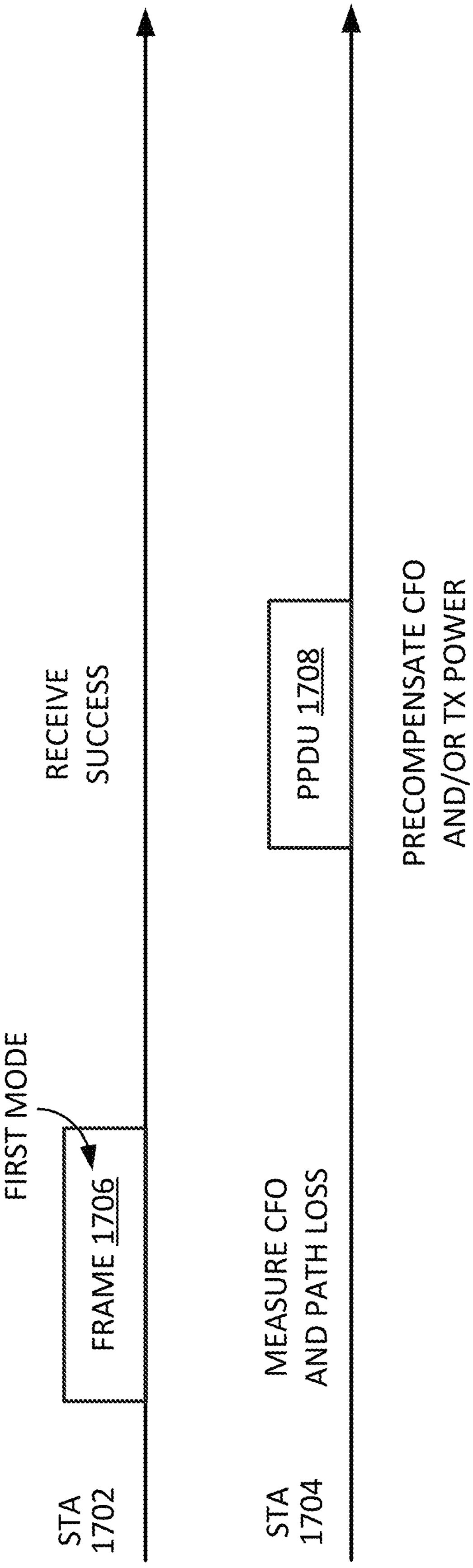
FIG. 17 illustrates an example of a procedure using an ELR PPDU according to an embodiment.

FIG. 17 illustrates an example 1700 of a procedure using an ELR PPDU according to an embodiment. As shown in FIG. 17, example 1700 includes a STA 1702 and a STA 1704. In an example, STA 1702 may be an AP STA, and STA 1704 may be a non-AP STA, or vice versa. In another example, STAs 1702 and 1704 may be AP STAs or non-AP STAs.

In example 1700, STA 1702 may determine that STA 1704 is to use a first mode to transmit a PPDU 1708 to STA 1704. The first mode may comprise an ELR operation mode. In an embodiment, STA 1704 using the first mode comprises STA 1704 using a first format for PPDU 1708. The first format may be an ELR PPDU format such as that of ELR PPDU 1500. Specifically, the ELR PPDU format may include a legacy preamble and an ELR preamble and may reuse an L-LTF of the legacy preamble as an ELR-STF of the ELR preamble.

In an example, STA 1702 may transmit to STA 1704 a frame 1706 with an indication for STA 1704 to use the first mode to transmit PPDU 1708 to STA 1702 (or an indication that STA 1704 is permitted to use the first mode to transmit PPDU 1708 to STA 1702 or an indication that STA 1702 enables reception of PPDUs using the first mode (e.g., ELR PPDUs)). In an embodiment, frame 1706 includes an ELR field that includes the indication. In an implementation, PPDU 1708 may be the next PPDU that STA 1704 transmits to STA 1702 after receiving frame 1706. For example, when STA 1702 is an AP STA, frame 1706 may be a beacon frame or an action frame that indicates to STA 1704 to use the first mode to transmit the next PPDU to STA 1702. In another implementation, frame 1706 may be a triggering frame for PPDU 1708, and STA 1704 may transmit PPDU 1708 in response to frame 1706. For example, STA 1704 may transmit PPDU 1708 a SIFS after receiving frame 1706.

In an embodiment, based on the indication to use the first mode to transmit PPDU 1708 (or the indication that STA 1704 is permitted to use the first mode to transmit PPDU 1708 to STA 1702 or the indication that STA 1702 enables reception of PPDUs using the first mode), STA 1704 transmits PPDU 1708 using the first mode. That is, STA 1704 uses the first format for PPDU 1708. Additionally, based on the indication, STA 1704 may be configured to pre-compensate PPDU 1708 for carrier frequency offset and/or transmit power to eliminate the need for STA 1702 to perform CFO estimation and/or AGC based on the ELR-STF of PPDU 1708, provided by the L-LTF of the legacy preamble of PPDU 1708.

In an embodiment, STA 1704 may be configured determine a first carrier frequency offset of frame 1706. The first carrier frequency offset of frame 1706 may correspond to a difference between a first carrier frequency of frame 1706 and a second carrier frequency of a local oscillator of STA 1704. In an embodiment, STA 1704 may be further configured to determine a first symbol clock offset (or symbol clock error) of frame 1706. The first symbol clock offset of frame 1706 may correspond to a difference between a first symbol clock value measured based on frame 1706 and a second symbol clock value based on a reference symbol clock at STA 1704.

In an embodiment, STA 1704 may pre-compensate PPDU 1708 for carrier frequency offset based on the first carrier frequency offset of frame 1706. In an implementation, STA 1704 may process PPDU 1708 such that a second carrier frequency offset of PPDU 1708 is based on the first carrier frequency offset of frame 1706. In an embodiment, the second carrier frequency offset may be set to a negative of the first carrier frequency offset. As such, the need for coarse CFO estimation by STA 1702 based on PPDU 1708 may be eliminated.

In another embodiment, STA 1704 may pre-compensate PPDU 1708 for symbol clock offset such that a second symbol clock offset of PPDU 1708 is based on the first symbol clock offset of frame 1706. Coarse symbol timing by STA 1702 based on PPDU 1708 may thus be eliminated.

In another embodiment, STA 1704 may pre-compensate a transmit power of PPDU 1708. In an implementation, STA 1704 may determine a transmit power offset and may adjust a selected transmit power of PPDU 1708 based on the transmit power offset. In an embodiment, STA 1704 may determine a pathloss of a channel from STA 1702 and 1704 and may determine the transmit power offset based on the pathloss. In an implementation, frame 1706 may indicate a first transmit power used to transmit frame 1706. For example, frame 1706 may comprise a transmit power field that indicates the first transmit power. The transmit power field may be set by STA 1702 as described in FIG. 8 above with respect to the Transmit Power Used field of Link Measurement Request frame 800. To determine the pathloss, STA 1702 may subtract the first transmit power from an RSSI of frame 1706. In an embodiment, the selected transmit power of PPDU 1708 may be based on a target receive power of PPDU 1708 at STA 1702. In an implementation, frame 1706 may indicate the target receive power of PPDU 1708. STA 1704 may determine the transmit power of PPDU 1708 based on the target receive power of PPDU 1708 and the pathloss. In an embodiment, the transmit power of PPDU 1708 may be equal to the target receive power of PPDU 1708 minus the pathloss.

In an embodiment, STA 1702 may detect PPDU 1708 using the ELR-STF, provided by the L-LTF of the legacy preamble of PPDU 1708. In another embodiment, STA 1702 may determine a symbol timing of PPDU 1708 using the ELR-STF, provided by the L-LTF of the legacy preamble of PPDU 1708. With PPDU 1708 pre-compensated for carrier frequency offset and/or transmit power, STA 1702 may not (or may not need to) perform coarse CFO estimation and/or AGC based on PPDU 1708. As such, STA 1702 may successfully receive PPDU 1708 even if STA 1702 fails to detect the L-STF of the legacy preamble of PPDU 1708.

Figure 18:
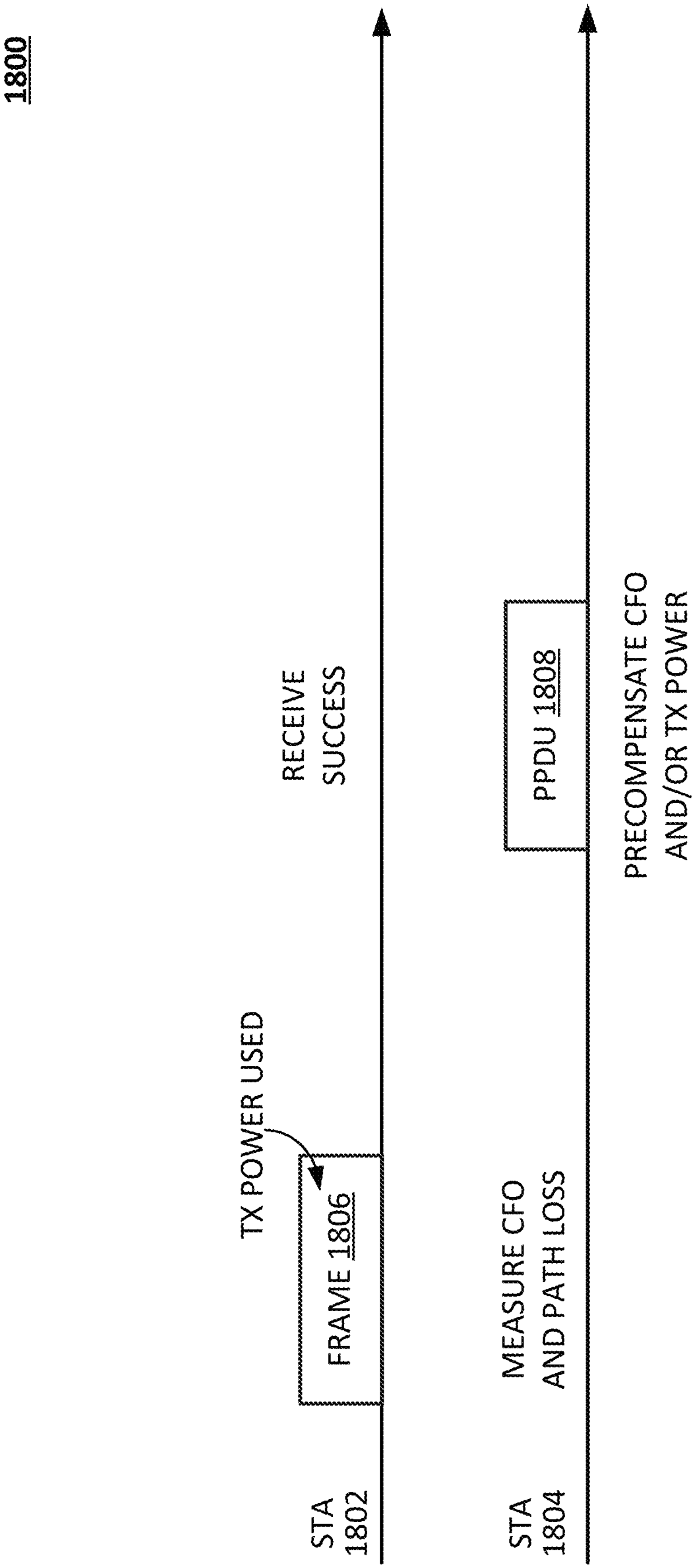
FIG. 18 illustrates an example of a procedure using an ELR PPDU according to an embodiment.

FIG. 18 illustrates an example 1800 of another procedure of using an ELR PPDU according to an embodiment. As shown in FIG. 18, example 1800 includes a STA 1802 and a STA 1804. In an example, STA 1802 may be an AP STA, and STA 1804 may be a non-AP STA, or vice versa. In another example, STAs 1802 and 1804 may be AP STAs or non-AP STAs.

In example 1800, STA 1804 may determine whether to transmit a PPDU 1808 using the first mode based on an RSSI of a frame 1806 received by STA 1804 from STA 1802. As described above, the first mode may comprise an ELR operation mode. In an embodiment, STA 1804 using the first mode comprises STA 1804 using a first format for PPDU 1808. The first format may be an ELR PPDU format such as that of ELR PPDU 1500. Specifically, the ELR PPDU format may include a legacy preamble and an ELR preamble and may reuse an L-LTF of the legacy preamble as an ELR-STF of the ELR preamble. Frame 1806 may be any frame received by STA 1804 from STA 1802. For example, frame 1806 may be a control frame, a management frame, or a data frame. In an embodiment, where STA 1802 is an AP STA, frame 1806 may be a beacon frame or an action frame. In an embodiment, STA 1804 may determine to transmit PPDU 1808 using the first mode when an RSSI of frame 1806 is below a threshold. In an implementation, the threshold is equal to −82 dBm.

In another implementation, STA 1804 may determine whether to transmit PPDU 1808 using the first mode based on a pathloss of a channel from STA 1802 to STA 1804. In an embodiment, frame 1806 may indicate a first transmit power used to transmit frame 1806. For example, frame 1806 may comprise a transmit power field that indicates the first transmit power. The transmit power field may be set by STA 1802 as described in FIG. 8 above with respect to the Transmit Power Used field of Link Measurement Request frame 800. To determine the pathloss, STA 1802 may subtract the first transmit power from an RSSI of frame 1806. In an embodiment, STA 1804 may determine to transmit PPDU 1808 using the first mode when the pathloss is above a threshold.

In an embodiment, based on determining to use the first mode for PPDU 1808, STA 1804 may be configured to pre-compensate PPDU 1808 for carrier frequency offset and/or transmit power to eliminate the need for STA 1802 to perform CFO estimation and/or AGC based on the ELR-STF of PPDU 1808, provided by the L-LTF of the legacy preamble of PPDU 1808.

In an embodiment, STA 1804 may be configured determine a first carrier frequency offset of frame 1806. The first carrier frequency offset of frame 1806 may correspond to a difference between a first carrier frequency of frame 1806 and a second carrier frequency of a local oscillator of STA 1804. In an embodiment, STA 1804 may be further configured to determine a first symbol clock offset (or symbol clock error) of frame 1806. The first symbol clock offset of frame 1806 may correspond to a difference between a first symbol clock value measured based on frame 1806 and a second symbol clock value based on a reference symbol clock at STA 1804.

In an embodiment, STA 1804 may pre-compensate PPDU 1808 for carrier frequency offset based on the first carrier frequency offset of frame 1806. In an implementation, STA 1804 may process PPDU 1808 such that a second carrier frequency offset of PPDU 1808 is based on the first carrier frequency offset of frame 1806. In an embodiment, the second carrier frequency offset may be set to a negative of the first carrier frequency offset. As such, the need for coarse CFO estimation by STA 1802 based on PPDU 1808 may be eliminated.

In another embodiment, STA 1804 may pre-compensate PPDU 1808 for symbol clock offset such that a second symbol clock offset of PPDU 1808 is based on the first symbol clock offset of frame 1806. Coarse symbol timing by STA 1802 based on PPDU 1808 may thus be eliminated.

In another embodiment, STA 1804 may pre-compensate a transmit power of PPDU 1808. In an implementation, STA 1804 may determine a transmit power offset and may adjust a selected transmit power of PPDU 1808 based on the transmit power offset. In an embodiment, STA 1804 may determine the pathloss of the channel from STA 1802 and 1804 and may determine the transmit power offset based on the pathloss. In an implementation, frame 1806 may indicate the target receive power of PPDU 1808. STA 1804 may determine the transmit power of PPDU 1808 based on the target receive power of PPDU 1808 and the pathloss. In an embodiment, the transmit power of PPDU 1808 may be equal to the target receive power of PPDU 1808 minus the pathloss.

In an embodiment, STA 1802 may detect PPDU 1808 using the ELR-STF, provided by the L-LTF of the legacy preamble of PPDU 1808. In another embodiment, STA 1802 may determine a symbol timing of PPDU 1808 using the ELR-STF, provided by the L-LTF of the legacy preamble of PPDU 1808. With PPDU 1808 pre-compensated for carrier frequency offset and/or transmit power, STA 1802 may not (or may not need to) perform coarse CFO estimation and/or AGC based on PPDU 1808. As such, STA 1802 may successfully receive PPDU 1808 even if STA 1802 fails to detect the L-STF of the legacy preamble of PPDU 1808.

Figure 19:
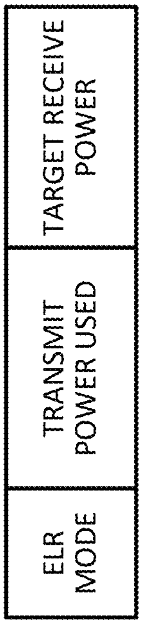
FIG. 19 illustrates an example ELR field that may be used according to embodiments.

FIG. 19 illustrates an example ELR field 1900 that may be used according to embodiments. For example, example ELR field 1900 may be carried in a first frame, such as frame 1706 described above. As shown in FIG. 19, example ELR field 1900 includes an ELR mode field, a Transmit Power Used field, and a Target Receive Power field. The ELR mode field indicates whether a receiver of the first frame is to use the first mode to transmit a PPDU to the transmitter of the first frame. The Transmit Power Used field indicates a transmit power used by the transmitter of the first frame to transmit the first frame. The Transmit Power Used field may be set by the transmitter of the first frame as described in FIG. 8 above with respect to the Transmit Power Used field of Link Measurement Request frame 800. The Target Receive Power field indicates a target receive power of the PPDU at the transmitter of the first frame.

In another embodiment (not shown in FIG. 18), an example ELR field may include the Transmit Power Used field and the Target Receive Power field but may not include the ELR mode field. The ELR field may be carried in a first frame, such as frame 1806 described above.

Figure 20:
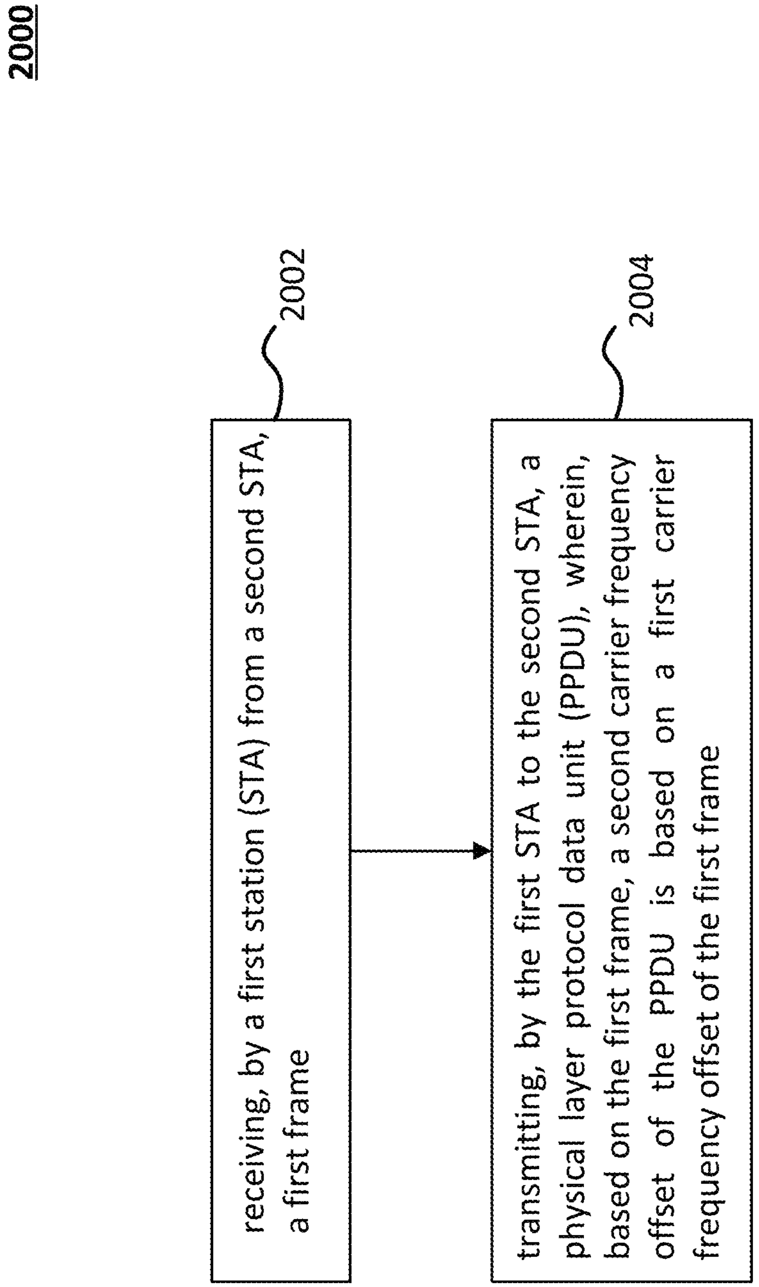
FIG. 20 illustrates an example process according to an embodiment.

FIG. 20 illustrates an example process 2000 according to an embodiment. Example process 2000 may be performed by a first STA, such as STA 1704 or STA 1804, for example. The first STA may be an AP STA or a non-AP STA. As shown in FIG. 20, process 2000 may include steps 2002 and 2004.

Step 2002 includes receiving, by the first STA from a second STA, a first frame. The second STA may be an AP STA or a non-AP STA. In an embodiment, the second STA may be an AP STA, and the first frame may be a beacon frame or an action frame.

In an embodiment, the first frame comprises an indication for the first STA to use a first mode to transmit a PPDU to the second STA (or an indication that the first STA is permitted to use the first mode to transmit a PPDU the second STA or an indication that first STA enables reception of PPDUs using the first mode (e.g., ELR PPDUs)). In an embodiment, the first mode comprises an ELR operation mode. In an embodiment, the first frame comprises an ELR field, and the ELR field comprises the indication. In an embodiment, the first STA using the first mode comprises the first STA using a first format for the PPDU. The first format may be an ELR PPDU format. For example, the first format may be the format of ELR PPDU 1500 described above. In an embodiment, the first format comprises an L-STF, an L-LTF, an L-SIG, an RL-SIG, and/or a U-SIG field. The U-SIG field may comprise a plurality of OFDM symbols. For example, the U-SIG field may comprise two OFDM symbols (U-SIG1, U-SIG2) or four OFDM symbols as illustrated by example U-SIG field 600. In an embodiment, the first format comprises a legacy preamble, an ELR preamble, and a data portion. The ELR preamble may reuse fields of the legacy preamble. For example, an ELR-STF of the ELR preamble may be provided an L-LTF of the legacy preamble.

Step 2004 includes transmitting, by the first STA to the second STA, a PPDU. In an embodiment, a second carrier frequency offset of the PPDU is based on a first carrier frequency offset of the first frame. In another embodiment, based on the first frame (e.g., comprising the indication), a second carrier frequency offset of the PPDU is based on a first carrier frequency offset of the first frame. In an embodiment, the second carrier frequency offset of the PPDU is a negative of the first carrier frequency offset of the first frame. In an embodiment, the second carrier frequency offset of the PPDU is based on the first carrier frequency offset of the first frame based on the first frame indicating the first mode. In another embodiment, the second carrier frequency offset of the PPDU is based on the first carrier frequency offset of the first frame based on an RSSI of the first frame being below a threshold. In an embodiment, the threshold is equal to −82 dBm. In a further embodiment, the second carrier frequency offset of the PPDU is based on the first carrier frequency offset of the first frame based on a determined pathloss of a channel from the second STA to the first STA being above a threshold. In an embodiment, the first STA determines the pathloss based on the RSSI of the first frame and a first transmit power used by the second STA to transmit the first frame. In an embodiment, the first frame indicates the first transmit power. For example, the first frame may comprise a transmit power field that indicates the first transmit power. In an embodiment, the first STA determines the pathloss by subtracting the subtracting the first transmit power from the RSSI of the first frame. In an embodiment, the first STA pre-compensates the PPDU for carrier frequency offset using the second carrier frequency offset.

In an embodiment, transmitting the PPDU in step 2004 further comprises pre-compensating a transmit power of the PPDU based on the first frame. In an embodiment, the first STA pre-compensates the transmit power of the PPDU based on the first frame indicating the first mode, the RSSI of the first frame being below a threshold, or the determined pathloss of the channel from the second STA to the first STA being above a threshold. In an embodiment, pre-compensating the transmit power of the PPDU comprises determining, by the first STA, a transmit power offset of the PPDU based on the pathloss. In an embodiment, transmitting the PPDU in step 2004 comprises transmitting the PPDU with a second transmit power, where the second transmit power is based on a target receive power of the PPDU minus the pathloss. In an embodiment, the first frame indicates the target receive power of the PPDU.

In an embodiment, process 2000 may further comprise determining, by the first STA, a first symbol clock offset of the first frame and setting a second symbol clock offset of the PPDU based on the first symbol clock offset of the first frame. In an embodiment, the first STA sets the second clock offset of the PPDU based on the first symbol clock offset of the first frame, based on the first frame indicating the first mode, the RSSI of the first frame being below a threshold, or the determined pathloss of the channel from the second STA to the first STA being above a threshold.

In an embodiment, the transmitting of the PPDU in step 2004 comprises transmitting the PPDU during a transmission opportunity (TXOP) obtained by the first STA.

Figure 21:
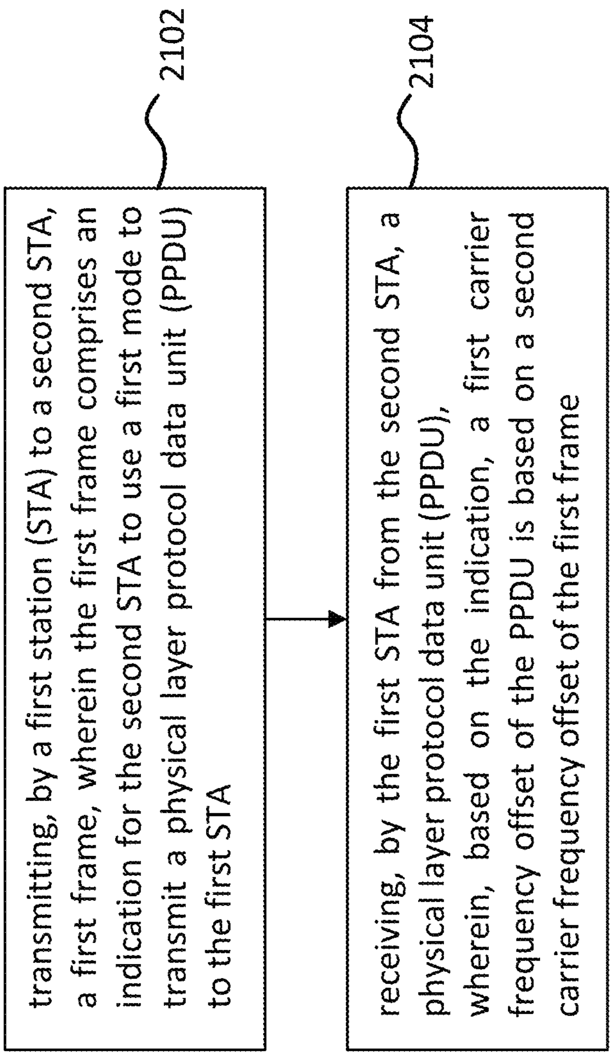
FIG. 21 illustrates another example process according to an embodiment.

FIG. 21 illustrates another example process 2100 according to an embodiment. Example process 2100 may be performed by a first STA, such as STA 1702 or STA 1802, for example. The first STA may be an AP STA or a non-AP STA. As shown in FIG. 21, process 2100 may include steps 2102 and 2104.

Step 2102 includes transmitting, by the first STA to a second STA, a first frame, where the first frame comprises an indication for the second STA to use a first mode to transmit a PPDU to the first STA (or the indication that the second is permitted to use the first mode to transmit a PPDU to the first STA or the indication that the first STA enables reception of PPDUs using the first mode (e.g., ELR PPDUs)). In an embodiment, the first STA may be an AP STA, and the first frame may be a beacon frame or an action frame. In an embodiment, the first mode comprises an ELR operation mode. In an embodiment, the first frame comprises an ELR field, and the ELR field comprises the indication. In an embodiment, the second STA using the first mode comprises the second STA using a first format for the PPDU. The first format may be an ELR PPDU format. For example, the first format may be the format of ELR PPDU 1500 described above. In an embodiment, the first format comprises an L-STF, an L-LTF, an L-SIG, an RL-SIG, and a U-SIG field. The U-SIG field may comprise a plurality of OFDM symbols. For example, the U-SIG field may comprise two OFDM symbols (U-SIG1, U-SIG2) or four OFDM symbols as illustrated by example U-SIG field 600. In an embodiment, the first format comprises a legacy preamble, an ELR preamble, and a data portion. The ELR preamble may reuse fields of the legacy preamble. For example, an ELR-STF of the ELR preamble may be provided an L-LTF of the legacy preamble.

Step 2104 includes receiving, by the first STA from the second STA, the PPDU. In an embodiment, a first carrier frequency offset of the PPDU is based on a second carrier frequency offset of the first frame. In an embodiment, based on the indication, a first carrier frequency offset of the PPDU is based on a second carrier frequency offset of the first frame. In an embodiment, based on the indication, the second STA pre-compensates the PPDU for carrier frequency offset. In an embodiment, the first carrier frequency offset is a negative of the second carrier frequency offset.

In an embodiment, process 2100 may further comprise detecting, by the first STA, the PPDU using an L-LTF of the PPDU. In an embodiment, the L-LTF of the PPDU serves as an ELR-STF of the PPDU.

In another embodiment, process 2100 may further comprise determining, by the first STA and using the L-LTF, a symbol timing of the PPDU. In an embodiment, based on the indication, the second STA pre-compensates the PPDU for symbol clock offset. In an embodiment, a second symbol clock offset of the pre-compensated PPDU is based on a first symbol clock offset of the first frame.

In an embodiment, based on the indication, the second STA pre-compensates a transmit power of the PPDU. In an embodiment, the second STA pre-compensates the transmit power of the PPDU by determining a transmit power offset of the PPDU based on a pathloss of a channel from the first STA to the second STA. In an embodiment, the first frame indicates the target receive power of the PPDU, and the second STA determines the transmit power of the PPDU as the target receive power of the PPDU minus the pathloss.

In an embodiment, the receiving of the PPDU in step 2104 comprises receiving the PPDU during a TXOP obtained by the second STA.

The invention claimed is:

1. A station (STA) comprising:
one or more processors; and
memory storing instructions that, when executed by the one or more processors, cause the STA to:
receive, from an access point (AP), a beacon frame indicating that the STA is allowed to transmit enhanced long range (ELR) physical layer protocol data units (PPDUs) to the AP; and
based on the beacon frame indicating that the STA is allowed to transmit ELR PPDUs to the AP, transmit, to the AP, an ELR PPDU,
wherein a first carrier frequency offset of the ELR PPDU is based on a second carrier frequency offset of the beacon frame.

2. The STA of claim 1, wherein the beacon frame indicates that the AP enables reception of ELR PPDUs.

3. The STA of claim 1, wherein transmission of the ELR PPDU is in accordance with an ELR operation mode.

4. The STA of claim 3, wherein the beacon frame comprises an ELR field, and wherein the ELR field indicates that the STA is allowed to transmit ELR PPDUs to the AP.

5. The STA of claim 1, wherein a first symbol clock offset of the ELR PPDU is based on a second symbol clock offset of the beacon frame.

6. The STA of claim 1, wherein the instructions further cause the STA to pre-compensate the ELR PPDU for carrier frequency offset using the first carrier frequency offset.

7. The STA of claim 1, wherein the ELR PPDU is a non-trigger-based (non-TB) PPDU.

8. An access point (AP) comprising:

one or more processors; and memory storing instructions that, when executed by the one or more processors, cause the AP to:

transmit, to a station (STA), a beacon frame indicating that the STA is allowed to transmit enhanced long range (ELR) physical layer protocol data units (PPDUs) to the AP; and receive, from the STA, an ELR PPDU, wherein, based on the beacon frame indicating that the STA is allowed to transmit ELR PPDUs to the AP, a first carrier frequency offset of the ELR PPDU is based on a second carrier frequency offset of the beacon frame.

9. The AP of claim 8, wherein the beacon frame indicates that the AP enables reception of ELR PPDUs.

10. The AP of claim 8, wherein transmission of the ELR PPDU is in accordance with an ELR operation mode.

11. The AP of claim 10, wherein the beacon frame comprises an ELR field, and wherein the ELR field indicates that the STA is allowed to transmit ELR PPDUs to the AP.

12. The AP of claim 8, wherein a first symbol clock offset of the ELR PPDU is based on a second symbol clock offset of the beacon frame.

13. The AP of claim 8, wherein the ELR PPDU is pre-compensated for carrier frequency offset using the first carrier frequency offset.

14. The AP of claim 8, wherein the ELR PPDU is a non-trigger-based (non-TB) PPDU.

15. A non-transitory computer-readable medium comprising instructions that, when executed by one or more processors of a station (STA), cause the STA to:

receive, from an access point (AP), a beacon frame indicating that the STA is allowed to transmit enhanced long range (ELR) physical layer protocol data units (PPDUs) to the AP; and based on the beacon frame indicating that the STA is allowed to transmit ELR PPDUs to the AP, transmit, to the AP, an ELR PPDU, wherein a first carrier frequency offset of the ELR PPDU is based on a second carrier frequency offset of the beacon frame.

16. The non-transitory computer-readable medium of claim 15, wherein the beacon frame indicates that the AP enables reception of ELR PPDUs.

17. The non-transitory computer-readable medium of claim 15, wherein transmission of the ELR PPDU is in accordance with an ELR operation mode.

18. The non-transitory computer-readable medium of claim 17, wherein the beacon frame comprises an ELR field, and wherein the ELR field indicates that the STA is allowed to transmit ELR PPDUs to the AP.

19. The non-transitory computer-readable medium of claim 15, wherein a first symbol clock offset of the ELR PPDU is based on a second symbol clock offset of the beacon frame.

20. The non-transitory computer-readable medium of claim 15, wherein the instructions further cause the STA to pre-compensate the ELR PPDU for carrier frequency offset using the first carrier frequency offset.

* * * * *